(12) United States Patent
Hong et al.

(10) Patent No.: US 11,176,387 B2
(45) Date of Patent: Nov. 16, 2021

(54) DEVICE AND METHOD FOR RECOGNIZING OBJECT INCLUDED IN INPUT IMAGE

(71) Applicant: Samsung Electronics Co., Ltd., Gyeonggi-do (KR)

(72) Inventors: Hyun-seok Hong, Gyeonggi-do (KR); Sahng-gyu Park, Gyeonggi-do (KR); Seung-hoon Han, Seoul (KR); Bo-seok Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 73 days.

(21) Appl. No.: 16/490,273

(22) PCT Filed: Jan. 17, 2018

(86) PCT No.: PCT/KR2018/000784
§ 371 (c)(1),
(2) Date: Aug. 30, 2019

(87) PCT Pub. No.: WO2018/182153
PCT Pub. Date: Oct. 4, 2018

(65) Prior Publication Data
US 2020/0012868 A1 Jan. 9, 2020

(30) Foreign Application Priority Data
Mar. 30, 2017 (KR) .................. 10-2017-0040791

(51) Int. Cl.
*G06K 9/00* (2006.01)
*G06K 9/46* (2006.01)
*G06N 3/08* (2006.01)

(52) U.S. Cl.
CPC ........... *G06K 9/00805* (2013.01); *G06K 9/46* (2013.01); *G06N 3/08* (2013.01)

(58) Field of Classification Search
CPC .................................. G06K 9/46; G06N 3/08
See application file for complete search history.

(56) References Cited

U.S. PATENT DOCUMENTS 8,542,928 B2 * 9/2013 Kaneda .............. G06K 9/00281
382/190
8,761,498 B1 * 6/2014 Wu .................... G06K 9/00637
382/159
(Continued)

FOREIGN PATENT DOCUMENTS

JP 2002-269570 9/2002
JP 2012-221437 11/2012
(Continued)

OTHER PUBLICATIONS

International Search Report dated Apr. 30, 2018 issued in counterpart application No. PCT/KR2018/000784, 17 pages.
(Continued)

*Primary Examiner* — Fayyaz Alam
(74) *Attorney, Agent, or Firm* — The Farrell Law Firm, P.C.

(57) ABSTRACT

A device and method for recognizing an object included in an input image are provided, the device for recognizing the object included in the input image includes a memory in which at least one program is stored; a camera configured to capture an environment around the device; and at least one processor configured to execute the at least one program to recognize an object included in an input image, wherein the at least one program includes instructions to: obtain the input image by controlling the camera; obtain information about the environment around the device that obtains the input image; determine, based on the information about the environment, a standard for using a plurality of feature value sets in a combined way, the plurality of feature value sets being used to recognize the object in the input image; and recognize the object included in the input image, by using the plurality of feature value sets based on the determined (Continued)

standard for using the plurality of feature value sets in the combined way.

20 Claims, 19 Drawing Sheets

(56) References Cited

U.S. PATENT DOCUMENTS

| | | | | |
|---|---|---|---|---|
| 2011/0158510 A1* | 6/2011 | Aguilar | .............. | G06K 9/00718 |
| | | | | 382/159 |
| 2015/0023602 A1* | 1/2015 | Wnuk | ..................... | G06F 19/00 |
| | | | | 382/190 |
| 2017/0032222 A1* | 2/2017 | Sharma | ................ | G06K 9/4619 |
| 2018/0089493 A1* | 3/2018 | Nirenberg | ............ | G06K 9/4628 |
| 2018/0144211 A1* | 5/2018 | Ross | .................... | G06K 9/6202 |

FOREIGN PATENT DOCUMENTS

| | | |
|---|---|---|
| JP | 2016-161973 | 9/2016 |
| KR | 10-1573051 | 12/2015 |
| KR | 1020170021638 | 2/2017 |
| WO | WO 2015/098442 | 7/2015 |

OTHER PUBLICATIONS

Korean Office Action dated Aug. 30, 2021 issued in counterpart application No. 10-2017-0040791, 9 pages.

* cited by examiner

DEVICE AND METHOD FOR RECOGNIZING OBJECT INCLUDED IN INPUT IMAGE

PRIORITY

This application is a National Phase Entry of PCT International Application No. PCT/KR2018/000784 which was filed on Jan. 17, 2018, and claims priority to Korean Patent Application No. 10-2017-0040791, which was filed on Mar. 30, 2017, the content of each of which is incorporated herein by reference.

TECHNICAL FIELD

The present disclosure relates to a device and method for recognizing an object in an input image, and more particularly, to a device and method for recognizing an object based on information about an environment around the device that obtained an input image.

BACKGROUND ART

As data traffic has increased exponentially in line with the development in computer technologies, artificial intelligence (AI) has become an important trend for leading future innovation. AI emulates human thinking, and thus, in effect, it may be applied to all industry fields without limitations.

Representative AI technologies include pattern recognition, machine learning, a professional system, neural networks, natural language processing, etc.

Recently, with the continual accumulation of a large amount of data and advancement in the performance of related hardware, such as a central processing unit (CPU), as well as the development of an algorithm capable of self learning, such as deep learning, interest in a device using machine learning and a neural network has increased.

DESCRIPTION OF EMBODIMENTS

Technical Problem

Provided are a device and method for accurately recognizing an object by recognizing the object by using a plurality of feature value sets in a combined way, based on information about an environment around the device.

BEST MODE

Figure 1:
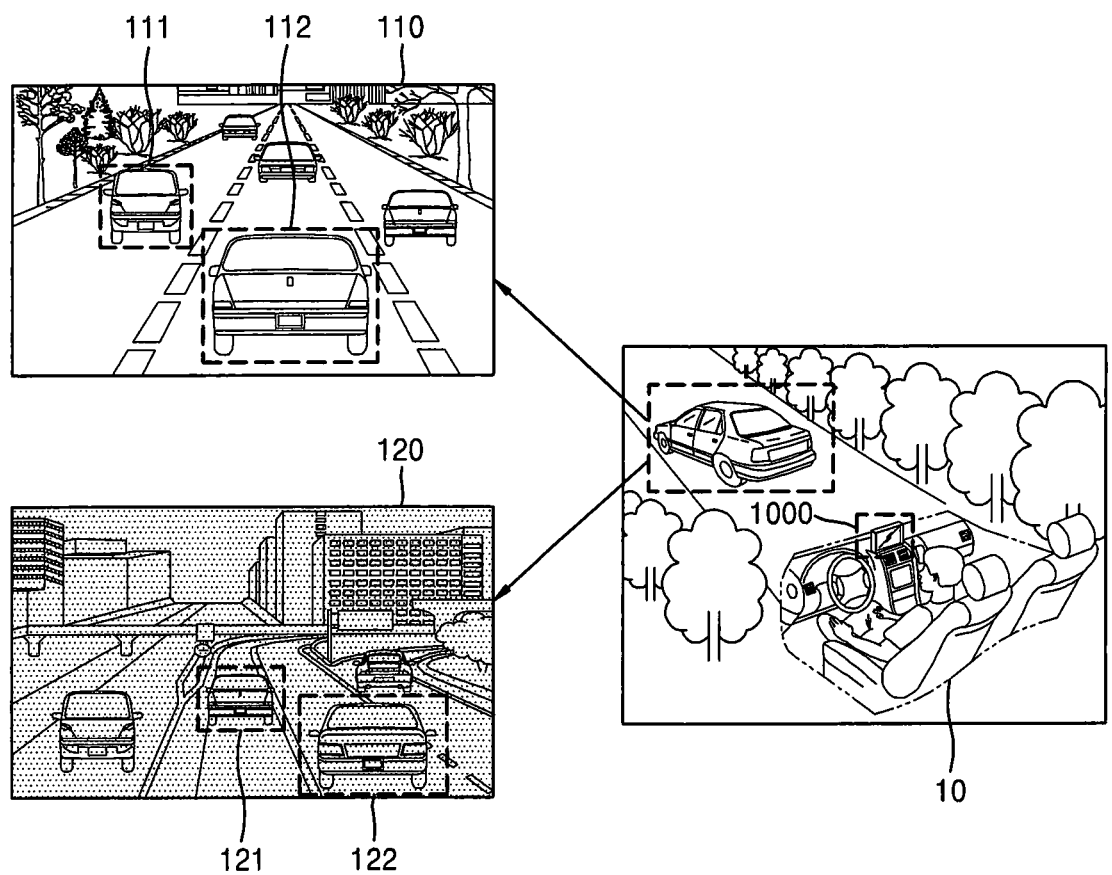
FIG. 1 is a view showing an overview of a device recognizing an object included in an input image, according to one or more embodiments.

According to an aspect of the disclosure, there is provided a device including: a memory in which at least one program is stored; a camera configured to capture an environment around the device; and at least one processor configured to execute the at least one program to recognize an object included in an input image, wherein the at least one program includes instructions to: obtain the input image by controlling the camera; obtain information about the environment around the device that obtains the input image; determine, based on the information about the environment, a standard for using a plurality of feature value sets in a combined way, the plurality of feature value sets being used to recognize the object in the input image; and recognize the object included in the input image, by using the plurality of feature value sets based on the determined standard for using the plurality of feature value sets in the combined way.

According to another aspect of the disclosure, there is provided a method performed by a device to recognize an object included in an input image, the method including: obtaining the input image by capturing an environment around the device; obtaining information about the environment around the device that obtains the input image; determining, based on the information about the environment, a standard for using a plurality of feature value sets in a combined way, the plurality of feature value sets being used to recognize the object in the input image; and recognizing the object included in the input image, by using the plurality of feature value sets based on the determined standard for using the plurality of feature value sets in the combined way.

According to another aspect of the disclosure, there is provided a computer-readable recording medium having recorded thereon a program for executing the method above on a computer.

MODE OF DISCLOSURE

Hereinafter, embodiments of the disclosure will be described in detail with reference to the accompanying drawings so that the scope of the disclosure will be fully conveyed to one of ordinary skill in the art. However, the disclosure may be embodied in different forms and should not be construed as limited to the embodiments set forth herein. Also, parts in the drawings unrelated to the detailed description are omitted to ensure clarity of the disclosure, and like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Hereinafter, the disclosure will be described in detail by referring to the accompanying drawings.

FIG. 1 is a view showing an overview of recognizing an object included in an input image by a device according to one or more embodiments.

A device 1000 may be configured to assist or control driving of a self-moving device, such as a vehicle or a robot. For example, as illustrated in FIG. 1, a vehicle 10 may include the device 1000 configured to assist or control driving of the vehicle 10, and the device 1000 may include, but is not limited to, an advanced driver assistance system (ADAS). Also, the device 1000 may be a part of devices included in the self-moving device, such as a vehicle or a robot.

The device 1000 according to one or more embodiments may recognize an object around the device 1000 by capturing an environment around the device 1000.

The device 1000 may obtain an input image by capturing the environment around the device 1000 and may recognize at least one object around the device 1000 by using the obtained input image. The object recognized by the device 1000 may include various objects around the device 1000 when the device 1000 is moving, such as a human being, a vehicle, a motorcycle, a building, a traffic lane, a tree, etc., but the object is not limited thereto.

The input image may be an image obtained by capturing an environment around the device 1000 and may include at least one object. The input image may be different according to the environment around the device 1000, even when the same object is captured. Here, the environment may include a place, the weather, a time, etc., but is not limited thereto. For example, referring to FIG. 1, a first input image 110 may be an image obtained by capturing the environment around the device 1000 during the daytime and a second input image 120 may be an image obtained by capturing the environment around the device 1000 during the night time. Because the environments in which the first input image 110 and the second input image 120 are captured are different from each other, colors, shapes, outlines, brightness, etc. of vehicles 111 and 112 in the first input image 110 may be different from those of vehicles 121 and 122 in the second input image 120. For example, the first input image 110 may be relatively brighter than the second input image 120 and the color of an object in the first input image 110 may be more vivid than the color of an object in the second input image 120 or the outline of the object in the first input image 110 may be clearer than the outline of the object in the second input image 120. Thus, the device 1000 may recognize the object in the input image by applying different references according to the information about the environment around the device 1000. For example, the device 1000 may recognize the object included in the input image by using different feature value sets, depending on the information about the environment.

The feature value set may be information used by the device 1000 to recognize the object included in the input image and may denote a set of feature values for identifying each object included in an input image. For example, the feature values for identifying the object may include an outline, a brightness, a color, a distribution of colors, and a brightness of the object, information about a variation in brightness, etc., but is not limited thereto. Also, the feature values for identifying the object may include feature values of pixels indicating the object. The feature values of the object included in the input image may be different according to the information about the environment around the device 1000. Thus, the device 1000 may recognize the object included in the input image by using different feature value sets according to information about the environment around the device 1000, in order to more accurately recognize the object. For example, referring to FIG. 1, the device 1000 may use different feature value sets to recognize the object included in the first input image 110 and the object included in the second input image 120. For example, the device 1000 may recognize the object included in the first input image 110 by using a first feature value set and the object included in the second input image 120 by using a second feature value set. Here, the first feature value set may be used to recognize an object included in an input image obtained during the daytime and the second feature value set may be used to recognize an object included in an input image obtained during the night time. However, it is not limited thereto.

However, even when the input image is obtained during the daytime, the feature values of the object included in the input image may be different according to the weather and/or the place around the device 1000. For example, the input image obtained in a dark place, such as a tunnel, may be dark, and the input image obtained in a cloudy day may also be dark. In this case, it may be difficult for the device 1000 to select an appropriate feature value set between the first feature value set and the second feature value set. Also, when only one of the first feature value set and the second feature value is selectively used, it may be difficult for the device 1000 to accurately recognize the object. Thus, in order for the device 1000 to accurately recognize the object included in the input image, a method of using a plurality of feature value sets in a combined way based on the information about the environment around the device 1000 is required.

Figure 2:
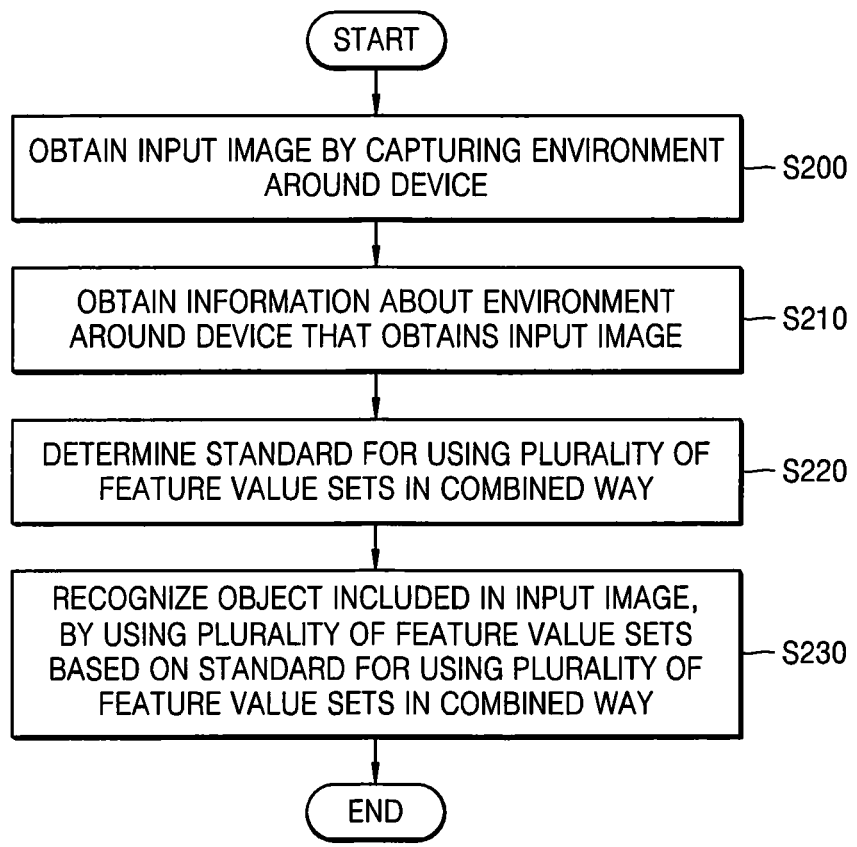
FIG. 2 is a flowchart of a method, performed by a device, of recognizing an object included in an input image, according to one or more embodiments.

FIG. 2 is a flowchart of a method of recognizing an object included in an input image by the device 1000, according to one or more embodiments.

In operation S200, the device 1000 may obtain the input image by capturing an environment around the device 1000. For example, the device 1000 may obtain the input image by capturing the environment around the device 1000 by using a camera. The obtained input image may include at least one object and the at least one object may include, but is not limited to, external vehicles, motorcycles, traffic lanes, buildings, human beings, animals, objects, etc., located around the device 1000.

In operation S210, the device 1000 may obtain information about the environment around the device 1000 that obtains the input image.

The information about the environment may include information about a time, the weather, a place, a brightness, etc. related to the device 1000, but is not limited thereto. The information about the time may denote information indicating the time in which the input image is obtained. For example, the device 1000 may obtain a time point of 24 hours a day, in which the input image is captured, as the information about the time, and according to an embodiment, the information about the time may be indicated as morning, day, evening, night, dawn, etc., but it is not limited thereto. The information about the weather may denote information indicating the weather around the device 1000 that obtains the input image. For example, the information about the weather may include information about cloudiness of the sky, rain, snow, fog, etc., but it is not limited thereto. The information about the place may denote information indicating a place around the device 1000 that obtains the input image. For example, the information about the place may include an underground parking lot, a tunnel, a downtown area, a highway, a mountain path, etc., but it is not limited thereto.

In operation S220, the device 1000 may determine, based on the information about the environment, a standard for using a plurality of feature value sets in a combined way, the plurality of feature sets being used to recognize an object in an input image. The plurality of feature value sets may include a first feature value set and a second feature value set. For example, the device 1000 may determine, based on the information about the environment, the standard for using the plurality of feature value sets in the combined way to use the first feature value set and the second feature value set. For example, the first feature value set may be used to recognize an object included in an input image captured during the daytime and the second feature value set may be used to recognize an object included in an input image captured during the night time. However, it is not limited thereto.

The device 1000 according to one or more embodiments may differently determine weights of the first feature value set and the second feature value set based on the information about the environment around the device 1000. The device 1000 may respectively apply the weight of the first feature value set and the weight of the second feature value set to a first object recognition result obtained by using the first feature value set and a second object recognition result obtained by using the second feature value set. Also, the device 1000 may recognize the object included in the input image, based on an object recognition result determined based on the first object recognition result to which the weight of the first feature value set is applied and the second object recognition result to which the weight of the second feature value set is applied.

The device 1000 according to one or more embodiments may determine use frequencies of the first feature value set and the second feature value set as being different from each other, based on the information about the environment around the device 1000. Also, the device 1000 may recognize an object included in at least one previous input image obtained during a certain time before the input image is obtained and may compare an object recognition rate based on the first feature value set with an object recognition rate based on the second feature value set. Also, the device 1000 may determine, based on a result of the comparison, the standard for using the plurality of feature value sets in the combined way to use each of the first feature value set and the second feature value set. A method of determining, based on the information about the environment, the standard for using the plurality of feature value sets in the combined way to use the first feature value set and the second feature value set will be described in detail below with reference to FIGS. 3 through 5.

In operation S230, the device 1000 may recognize the object included in the input image, by using the plurality of feature value sets based on the determined standard for using the plurality of feature value sets in the combined way. A result of recognizing an object by using a feature value set may be indicated as a probability value and the device 1000 may recognize the object included in the input image as an object having the highest probability value.

Figure 3:
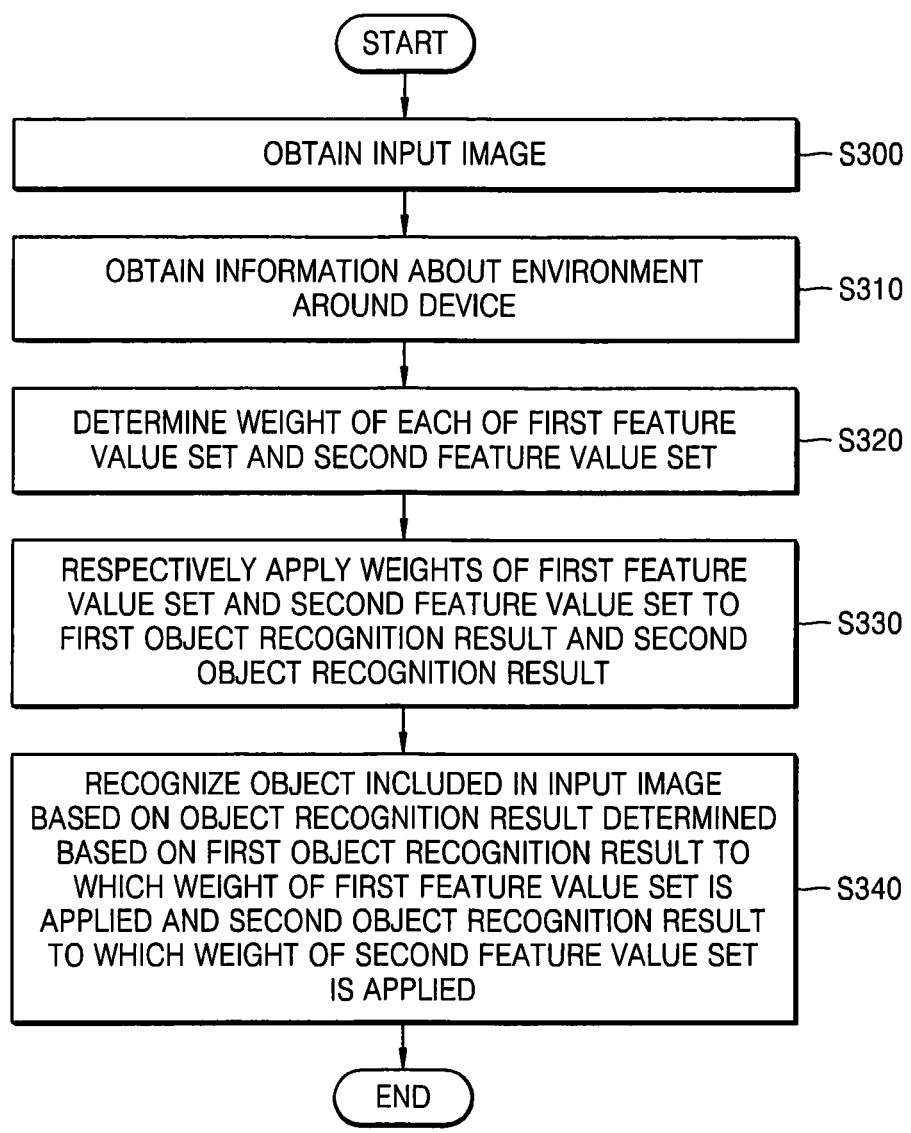
FIG. 3 is a flowchart of a method, performed by a device, of determining a standard for combining a plurality of feature value sets, according to one or more embodiments.

FIG. 3 is a flowchart of a method, performed by the device 1000, of determining a standard for using a plurality of feature value sets in a combined way, according to one or more embodiments.

The device 1000 according to one or more embodiments may determine weights of the plurality of value sets as being different from one another, based on information about an environment around the device 1000. For example, the plurality of feature value sets may include a first feature value set and a second feature value set. Here, the device 1000 may determine, based on the information about the environment around the device 1000, the weights of the first feature value set and the second feature value set as being different from each other.

Referring to FIG. 3, the device 1000 may obtain (S300) an input image by capturing the environment around the device 1000 and obtain (S310) the information about the environment around the device 1000 that obtains the input image. Operations S300 and S310 may correspond to operations S200 and S210 of FIG. 2, and thus, their detailed descriptions will not be given.

In operation S320, the device 1000 may determine the weight of each of the first feature value set and the second feature value set based on the information about the environment around the device 1000.

For example, the first feature value set and the second feature value set may respectively be the feature value sets used for an input image captured during the daytime and an input image captured during the night time. However, it is not limited thereto. For example, in the case of an input image captured at 1 PM in an underground parking lot, due to low luminance of the underground parking lot, the brightness of the input image, and the color, shape, outline, etc. of an object included in the input image may be similar to those of an input image captured at night. Here, the device 1000 may determine the weight of each of the first feature value set and the second feature value set, by taking into account information about a place (for example, the underground parking lot) around the device 1000 and information about a time (for example, 1 PM) around the device 1000. For example, the device 1000 may increase the weight of the second feature value set, as the luminance of the underground parking lot is decreased. As another example, in the case of an input image captured in a downtown area at 7 PM, due to effects of many skyscrapers and streetlights, the input image may be bright and the color and shape of an object included in the input image may be vivid. Here, the device 1000 may determine the weight of each of the first feature value set and the second feature value set, by taking into account the information about the place (for example, the downtown area) around the device 1000 and the information about the time (for example, 7 PM) around the device 1000. For example, the device 1000 may increase the weight of the first feature value set, as the numbers of skyscrapers and streetlights located around the device 1000 are increased.

In operation S330, the device 1000 may respectively apply the weight of the first feature value set and the weight of the second feature value set to a first object recognition result obtained by using the first feature value set and a second object recognition result obtained by using the second feature value set.

In operation S340, the device 1000 may recognize the object included in the input image, based on an object recognition result determined based on the first object recognition result to which the weight of the first feature value set is applied and the second object recognition result to which the weight of the second feature value set is applied. For example, the device 1000 may obtain a final object recognition result by combining the first object recognition result to which the weight of the first feature value set is applied and the second object recognition result to which the weight of the second feature value set is applied. Also, the device 1000 may recognize the object included in the input image based on the final object recognition result. Thus, when it is difficult to select any one of the plurality of feature value sets, the device 1000 may use the plurality of feature value sets in the combined way based on the information about the environment around the device 1000, so as to increase the object recognition rate and accurately recognize the object included in the input image.

Figure 4:
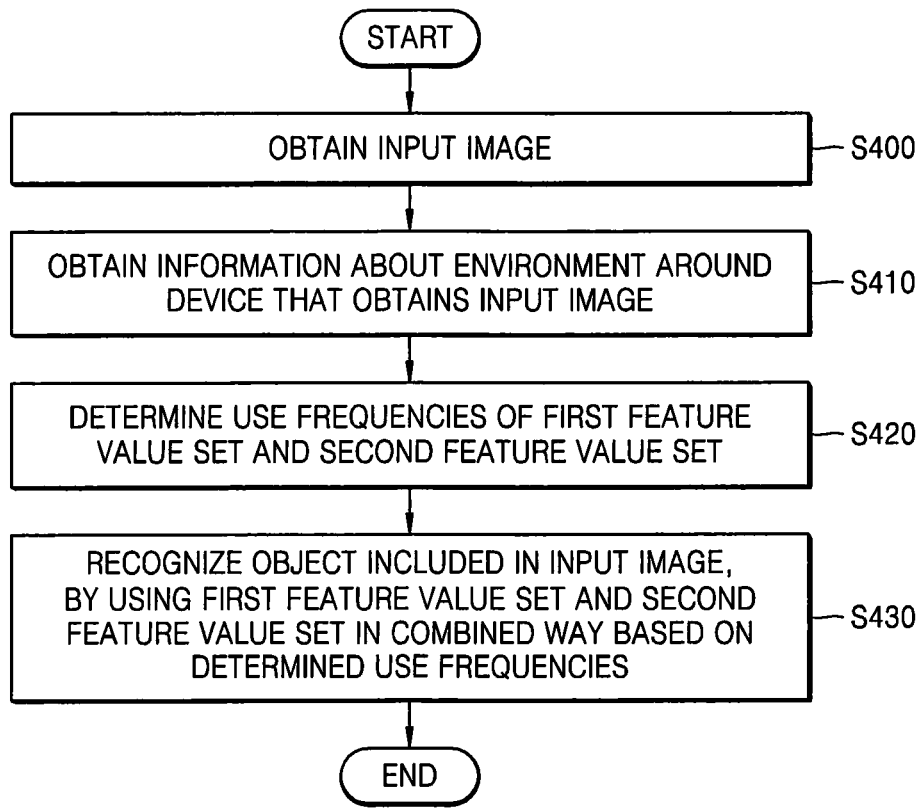
FIG. 4 is a flowchart of a method, performed by a device, of determining a standard for combining a plurality of feature value sets, according to other embodiments.

FIG. 4 is a flowchart of a method, performed by a device, of determining a standard for using a plurality of feature value sets in a combined way, according to other embodiments.

The device 1000 according to one or more embodiments may determine combined-use frequencies of a first feature value set and a second feature value set as being different from each other.

Referring to FIG. 4, the device 1000 may obtain (S400) an input image by capturing an environment around the device 1000 and obtain (S410) information about the environment around the device 1000 that obtains the input image.

In operation S420, the device 1000 may determine use frequencies of the first feature value set and the second feature value set based on the information about the environment around the device 1000.

For example, an input image obtained at 3 PM in a cloudy day may be dark and the color, shape, and outline of an object included in the input image may be similar to those of an input image obtained at night. Here, the device 1000 may determine the use frequencies of the first feature value set and the second feature value set, by taking into account at least one of weather information and time information indicating the degree of cloudiness. For example, the device 1000 may increase the use frequency of the second feature value set, as the weather is cloudier or the time in which the input image is obtained is closer to a sunset time. For example, when input images are obtained in a rainy day at 3 PM, the device 1000 may determine the ratio of the use frequencies of the first feature value set and the second feature value set as 2:1. However, it is not limited thereto.

In operation S430, the device 1000 may recognize the object included in the input image by using the first feature value set and the second feature value set in the combined way, based on the determined use frequencies. For example, the device 1000 may obtain twenty (20) input images in one second. Here, the input images obtained in one second may be referred to as first through twentieth input images, for convenience of explanation. For example, when the ratio of the use frequencies of the first feature value set and the second feature value set is determined as 2:1, the device 1000 may use the first feature value set for the first input image and the second input image and use the second feature value set for the third input image, to recognize the object. Also, the device 1000 may use the first feature value set for the fourth input image and the fifth input image and use the second feature value set for the sixth input image. However, it is not limited thereto.

Figure 5:
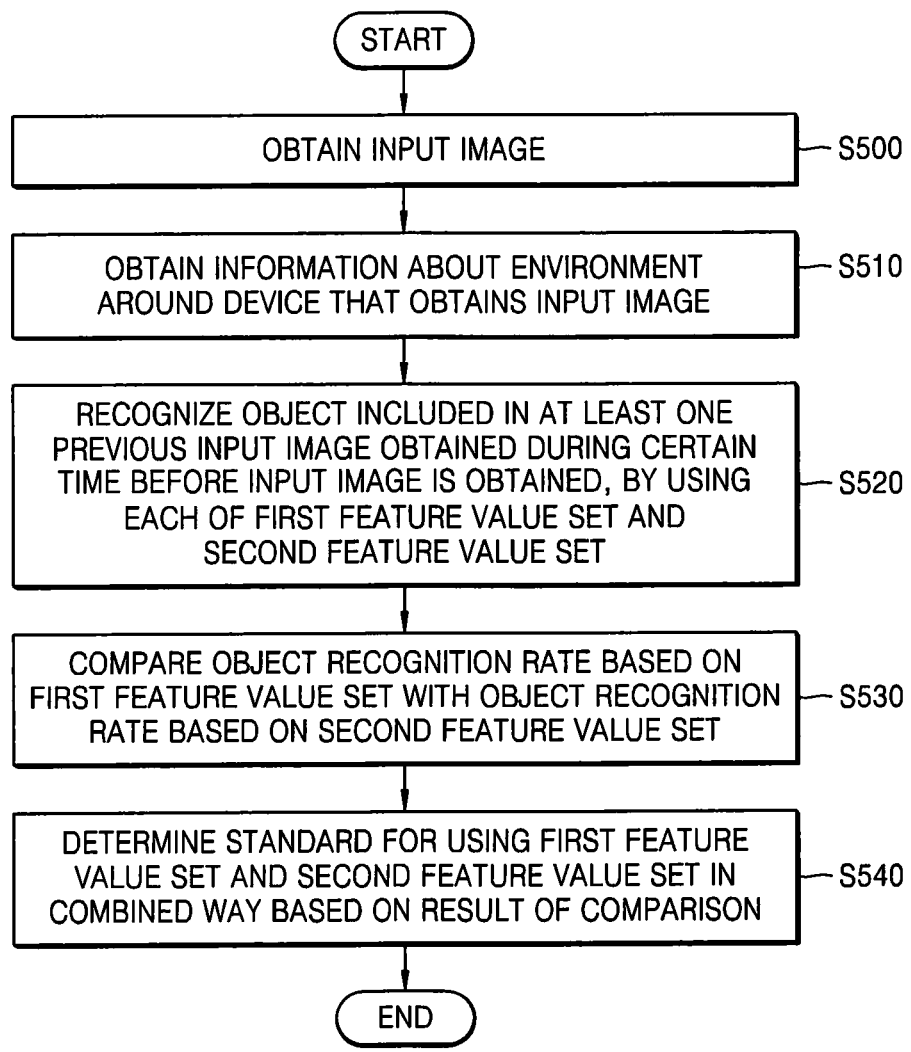
FIG. 5 is a flowchart of a method, performed by a device, of determining a standard for combining a plurality of feature value sets, according to other embodiments.

FIG. 5 is a flowchart of a method, performed by a device, of determining a standard for using a plurality of feature value sets in a combined way, according to other embodiments.

The device 1000 according to one or more embodiments may compare an object recognition result based on a first feature value set with an object recognition result based on a second feature value set and may determine, based on a result of the comparison, the standard for using the first feature value set and the second feature value set in the combined way.

Referring to FIG. 5, the device 1000 may obtain (S500) an input image by capturing an environment around the device 1000 and obtain (S510) information about the environment around the device 1000 that obtains the input image.

In operation S520, the device 1000 may recognize an object included in at least one previous input image obtained during a certain time before the input image is obtained, by using each of the first feature value set and the second feature value set. The device 1000 may have to change the standard for using the plurality of feature value sets in the combined way, as the environment around the device 1000 is changed. For example, when the information about the place around the device 1000 is changed from a highway to a tunnel, the luminance around the device 1000 may be changed, and thus, the device 1000 may change the standard for using the first feature value set and the second feature value set in the combined way. Here, the device 1000 may obtain a result of recognizing an object included in at least one previous input image obtained during a certain time (for example, one second) by using each of the first feature value set and the second feature value set. For example, when twenty input images are obtained during one second, the device 1000 may obtain an object recognition result based on each of the first feature value set and the second feature value set, with respect to the twenty input images.

In operation S530, the device 1000 may compare an object recognition rate based on the first feature value set with an object recognition rate based on the second feature value set. Thus, the device 1000 may identify based on which feature value set the object is more accurately recognized, with respect to the environment around the device 1000 that obtains the input image.

In operation S540, the device 1000 may determine the standard for using the first feature value set and the second feature value set in the combined way, based on a result of the comparison of the object recognition rates. For example, when the object recognition rate based on the first feature value set is higher than the object recognition rate based on the second feature value set, the device 1000 may determine a weight of the first feature value set to be greater than a weight of the second feature value set. Also, according to an embodiment, when the object recognition rate based on the first feature value set is higher than the object recognition rate based on the second feature value set, the device 1000 may determine a use frequency of the first feature value set to be greater than a use frequency of the second feature value set.

Alternatively, when a difference between the object recognition rates based on the first feature value set and the second feature value set is equal to or less than a critical value, the device 1000 may determine the weights of the first feature value set and the second feature value set to be the same. However, it is not limited thereto.

Figure 6:
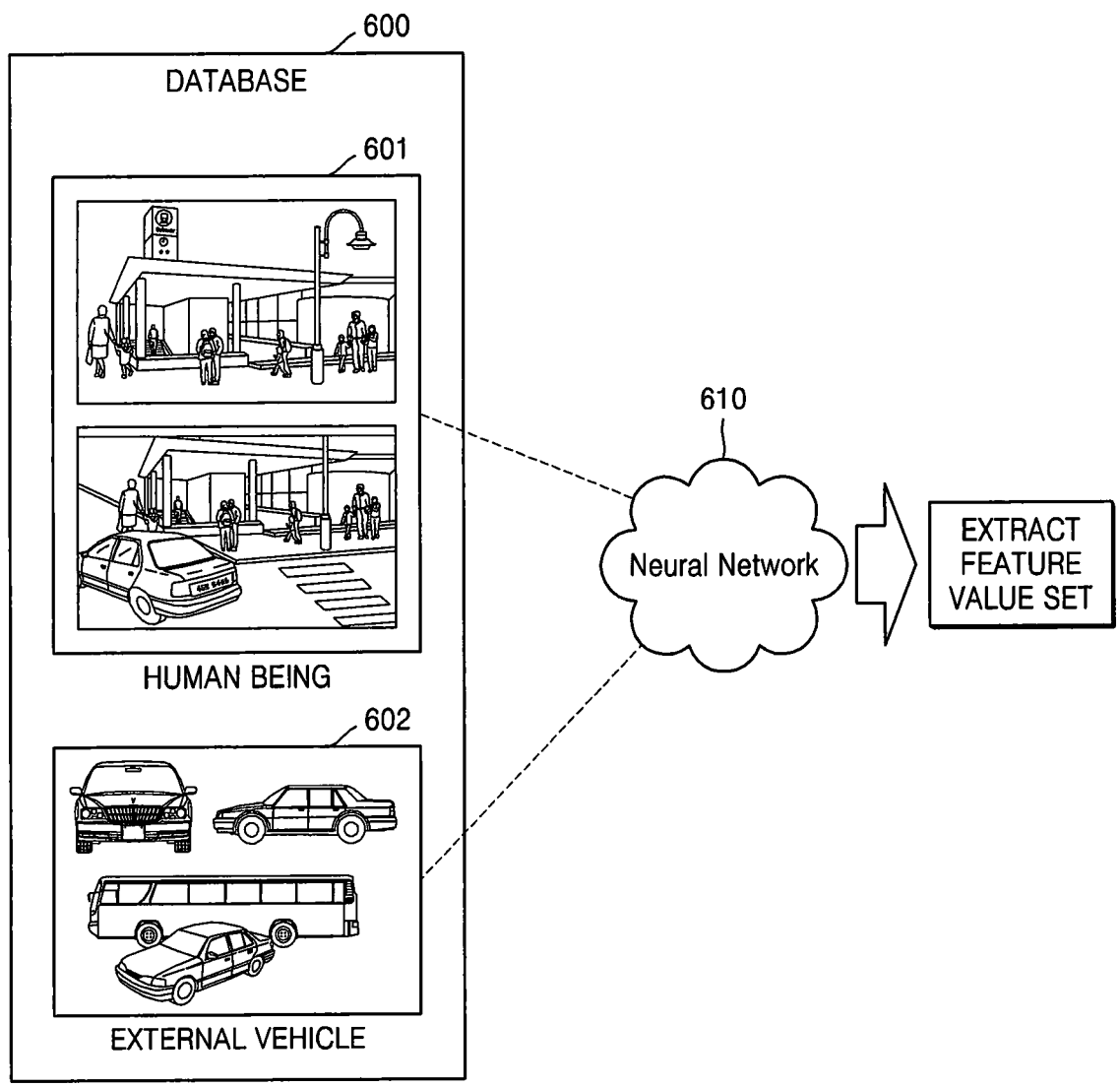
FIG. 6 is a view for describing a method, performed by a device, of learning a standard for recognizing an object included in an input image, according to one or more embodiments.

FIG. 6 is a view for describing a method, performed by a device, of learning a standard for recognizing an object included in an input image, according to one or more embodiments.

The device 1000 according to one or more embodiments may recognize the object included in the input image by using a neural network. For example, the neural network may be a set of algorithms configured to extract a feature value set from input images and recognize objects included in the image by using the extracted feature value set, by using a result of statistical machine learning.

Referring to FIG. 6, the device 1000 may learn the standard for recognizing the object included in the input image, by using a plurality of learning images stored in a database. Here, the plurality of learning images stored in the database may denote images obtained by capturing the environment around the device under various conditions and the plurality of learning images may include at least one object. For example, the plurality of learning images may include images obtained by capturing the environment around the device 1000 under the conditions in which at least one of a time, the weather, and a place is different.

Also, the plurality of learning images may include images obtained by capturing each object recognized by the device 1000 at different angles. For example, the object recognized by the device 1000 may include a human being, an external vehicle, a motorcycle, a lane, a building, etc., but it is not limited thereto. For example, referring to FIG. 6, a plurality of learning images 601 including a human being may include images obtained by capturing a plurality of human beings at different angles (for example, a front side, a rear side, and a lateral side), and may include images obtained by capturing the human beings under the conditions in which a time, the weather, a place, etc. are different Also, the plurality of learning images 602 including an external vehicle may include images obtained by capturing various types of external vehicles (for example, a midsize vehicle, a compact vehicle, a sports utility vehicle (SUV), etc.) at various angles, and may include images obtained by capturing the external vehicles under the conditions in which a time, the weather, a place, etc. are different.

The device 1000 according to one or more embodiments may detect a feature value of each object included in the learning image from the plurality of learning images, by using a neural network 610. For example, the device 1000 may detect a feature value of pixels indicating the objects included in the plurality of learning images, by using the neural network 610. Also, the device 1000 may detect information about at least one of an outline, a color, and a brightness of each object included in the plurality of learning images, but it is not limited thereto.

The device 10000 according to one or more embodiments may learn the detected feature value of each object, store a result of the learning, and recognize the object included in the input image by using the stored learning result. Also, the determination as to how to recognize the object included in the input image may be performed based on learning according to deep neural network technology including a recurrent neural network (RNN). However, it is not limited thereto.

Figure 7:
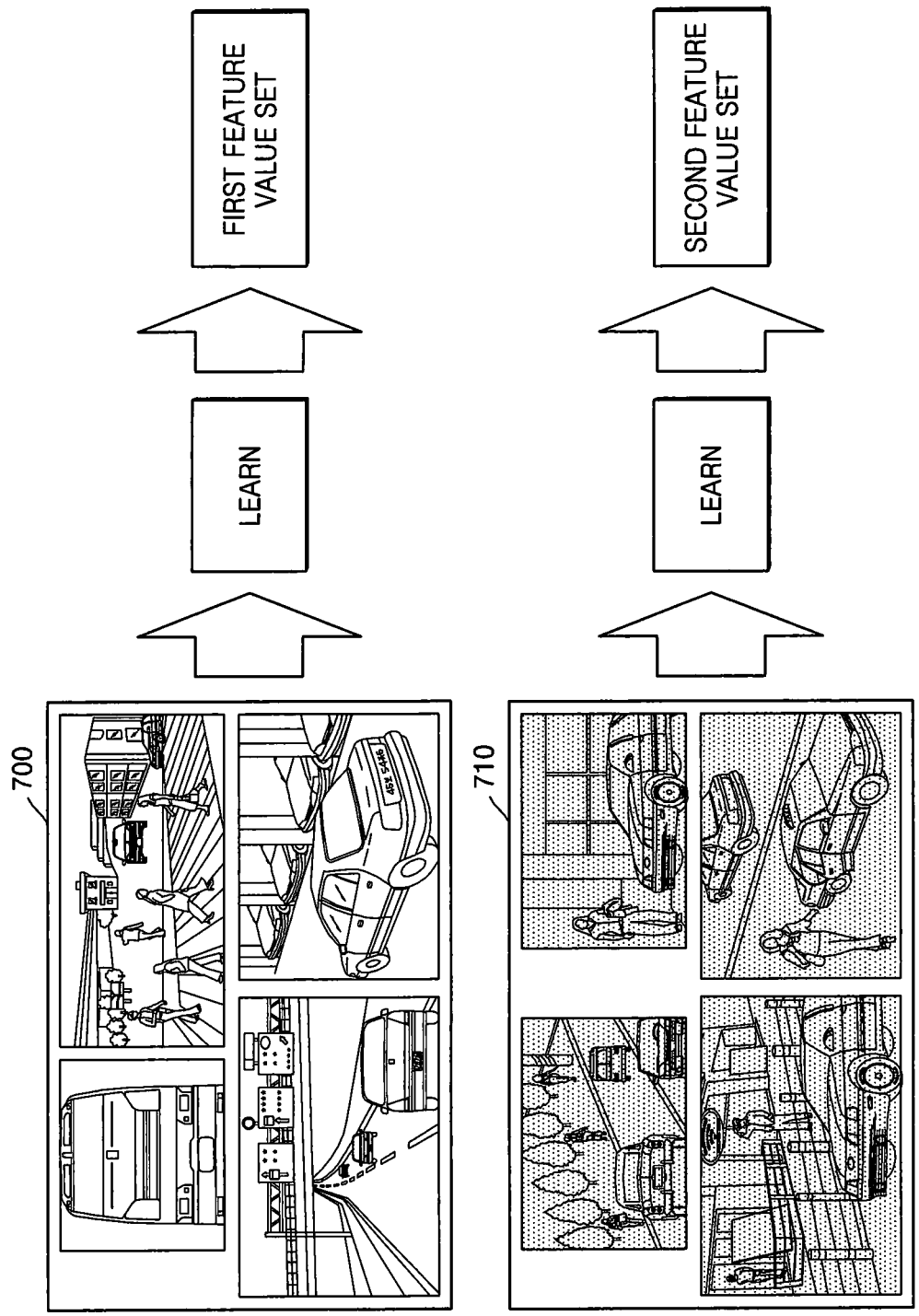
FIG. 7 is a view showing an example of determining a first feature value set and a second feature value set, according to one or more embodiments.

FIG. 7 is a view showing an example of determining a first feature value set and a second feature value set, according to one or more embodiments.

In some embodiments, a plurality of feature value sets may include the first feature value set and the second feature value set. For example, the first feature value set may be used for an input image captured during the daytime and the second feature value set may be used for an input image captured during the night time. However, it is not limited thereto.

Referring to FIG. 7, the device 1000 may learn a standard for recognizing an object included in the input image captured during the daytime, by using a first learning image 700. For example, the first learning image 700 may denote learning images captured during the daytime from among a plurality of learning images stored in a database. For example, the device 1000 may extract at least one feature value with respect to each object included in the first learning image 700. For example, the device 1000 may extract outline information, color information, brightness information, etc. of each object with respect to a human being, an external vehicle, a traffic line, a motorcycle, a building, etc. included in the first learning image 700. Also, the device 1000 may determine the first feature value set based on a result of learning the feature values of each object, the feature values being extracted from the first learning image 700.

Also, the device 1000 may learn a standard for recognizing an object included in the input image captured during the night time, by using a second learning image 710. For example, the second learning image 710 may denote learning images captured during the night time from among the plurality of learning images stored in the database. For example, the device 1000 may extract outline information, color information, brightness information, etc. of each object with respect to a human being, an external vehicle, a traffic line, a motorcycle, a building, etc. included in the second learning image 710. The device 1000 may determine the second feature value set based on a result of learning the feature values of each object, the feature values being extracted from the second learning image 710.

Even when the first learning image 700 and the second learning image 710 include the same object, the object included in the first learning image 700 and the object included in the second learning image 710 may have different outlines, different color distributions, different brightnesses, etc. Thus, the device 1000 may divide the plurality of learning images stored in the database into the first learning image 700 and the second learning image 710 and may learn each of the first learning image 700 and the second learning image 710 to determine the first feature value set and the second feature value set.

Figure 8:
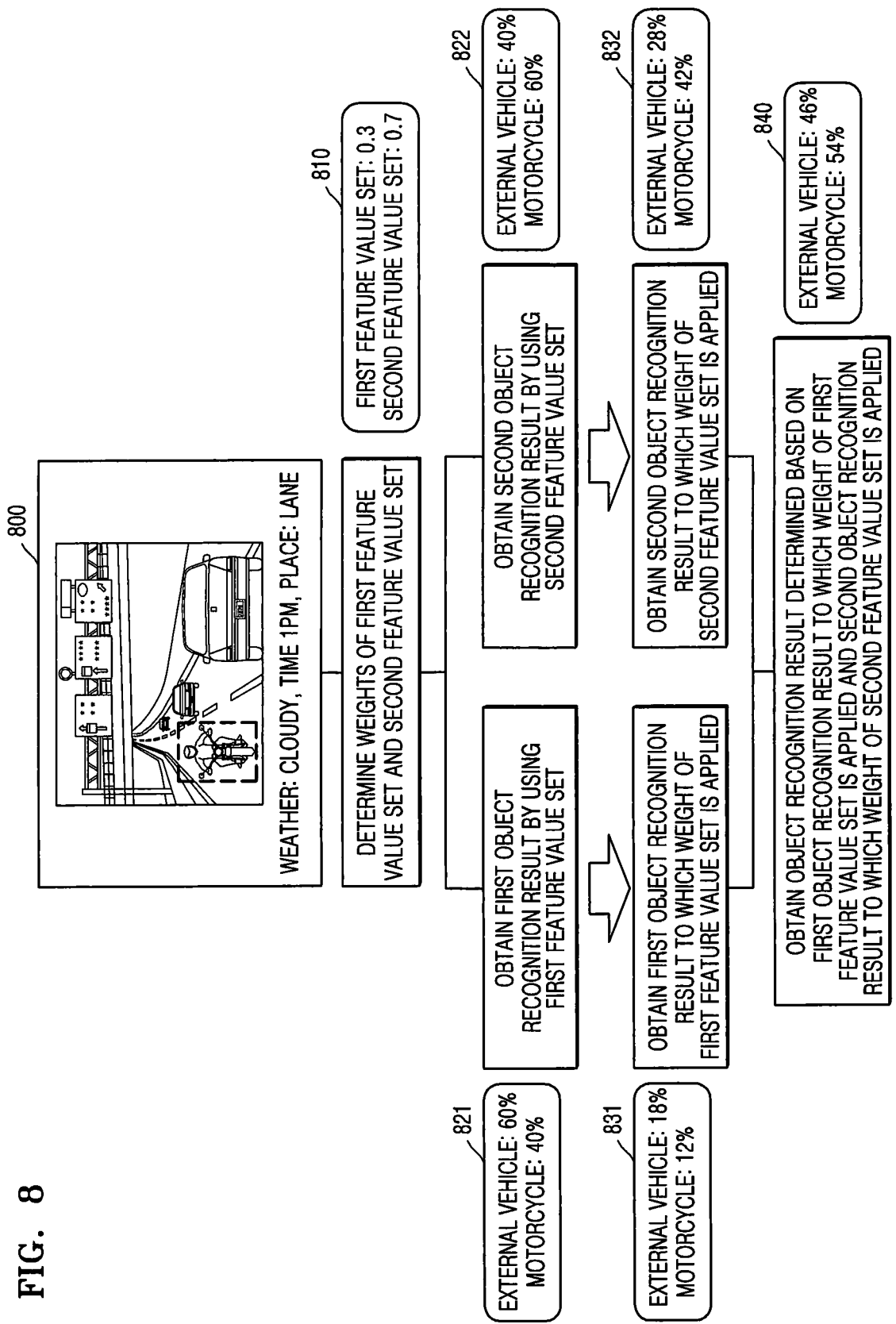
FIG. 8 is a view showing an example of applying different weights to a first feature value set and a second feature value set, according to one or more embodiments.

*83 FIG. 8 is a view showing an example of applying different weights to a first feature value set and a second feature value set by a device according to one or more embodiments.

The device 1000 according to one or more embodiments may determine a weight of each of the first feature value set and the second feature value set, based on information about an environment around the device 1000, and may respectively apply the weights of the first feature value set and the second feature value set to object recognition results obtained by using the first feature value set and the second feature value set, so as to recognize an object included in an input image.

Referring to FIG. 8, an input image 800 may be an image captured at 1 PM in a cloudy day. When the weather is cloudy, the luminance around the device 1000 may be lower and an object included in the input image 800 may be shown to be darker than when the weather is sunny. Thus, when the device 1000 recognizes the object included in the input image 800 by using only the first feature value set, the probability of accurately recognizing the object may be decreased.

The device 1000 according to one or more embodiments may differently determine weights of the first feature value set and the second feature value set based on the information about the environment around the device 1000. For example, the device 1000 may determine the weights of the first feature value set and the second feature value set as being different from each other by taking into account the information about a time, a place, and the weather around the device 1000 that obtains the input image. For example, even when an input image is captured during the daytime, when the luminance around the device 1000 is equal to or less than a predetermined critical level, the device 1000 may relatively increase the weight of the second feature value set.

As illustrated in FIG. 8, when the luminance around the device 1000 is low because the weather is cloudy, the device 1000 may determine (810) the weight of the first feature value set as 0.3 and the weight of the second feature value set as 0.7.

The device 1000 according to one or more embodiments may obtain a first object recognition result 821 by using the first feature value set and a second object recognition result 822 by using the second feature value set. In some embodiments, the first object recognition result 821 and the second object recognition result 822 may be indicated as probability values. For example, according to the first object recognition result, the probability that the recognized object is an external vehicle may be 60% and the probability that the recognized object is a motorcycle may be 40%, and according to the second object recognition result, the probability that the recognized object is an external vehicle may be 40% and the probability that the recognized object is a motorcycle may be 60%.

The device 1000 may apply the weight (for example, 0.3) of the first feature value set to the first object recognition result 821 and the weight (for example, 0.7) of the second feature value set to the second object recognition result 822. Thus, according to the first object recognition result 831 to which the weight of the first feature value set is applied, the probability that the recognized object is an external vehicle may be 18% and the probability that the recognized object is a motorcycle may be 12%. Also, according to the second object recognition result 832 to which the weight of the second feature value set is applied, the probability that the recognized object is an external vehicle may be 28% and the probability that the recognized object is a motorcycle may be 42%.

Also, the device 1000 may obtain a final object recognition result 840 determined based on the first object recognition result 831 to which the weight of the first feature value set is applied and the second object recognition result 832 to which the weight of the second feature value set is applied. Also, the device 1000 may recognize the object included in the input image as a motorcycle, based on the final object recognition result 840 (for example, that the probability that the recognized object is an external vehicle is 46% and the probability that the recognized object is a motorcycle is 54%).

Figure 9A:
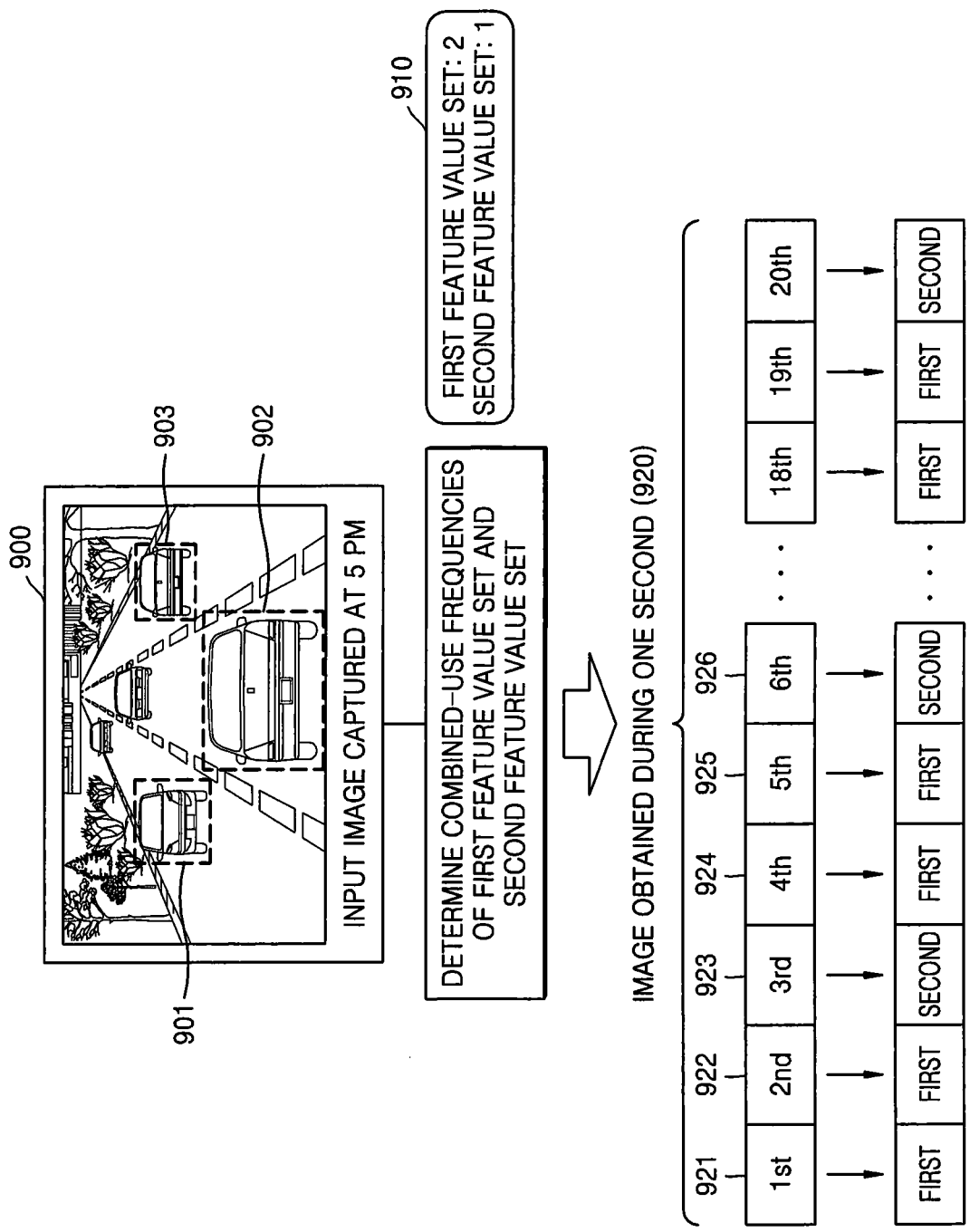
FIGS. 9A and 9B are views showing an example of a device determining different use frequencies of a first feature value set and a second feature value set, according to one or more embodiments.
Figure 9B:
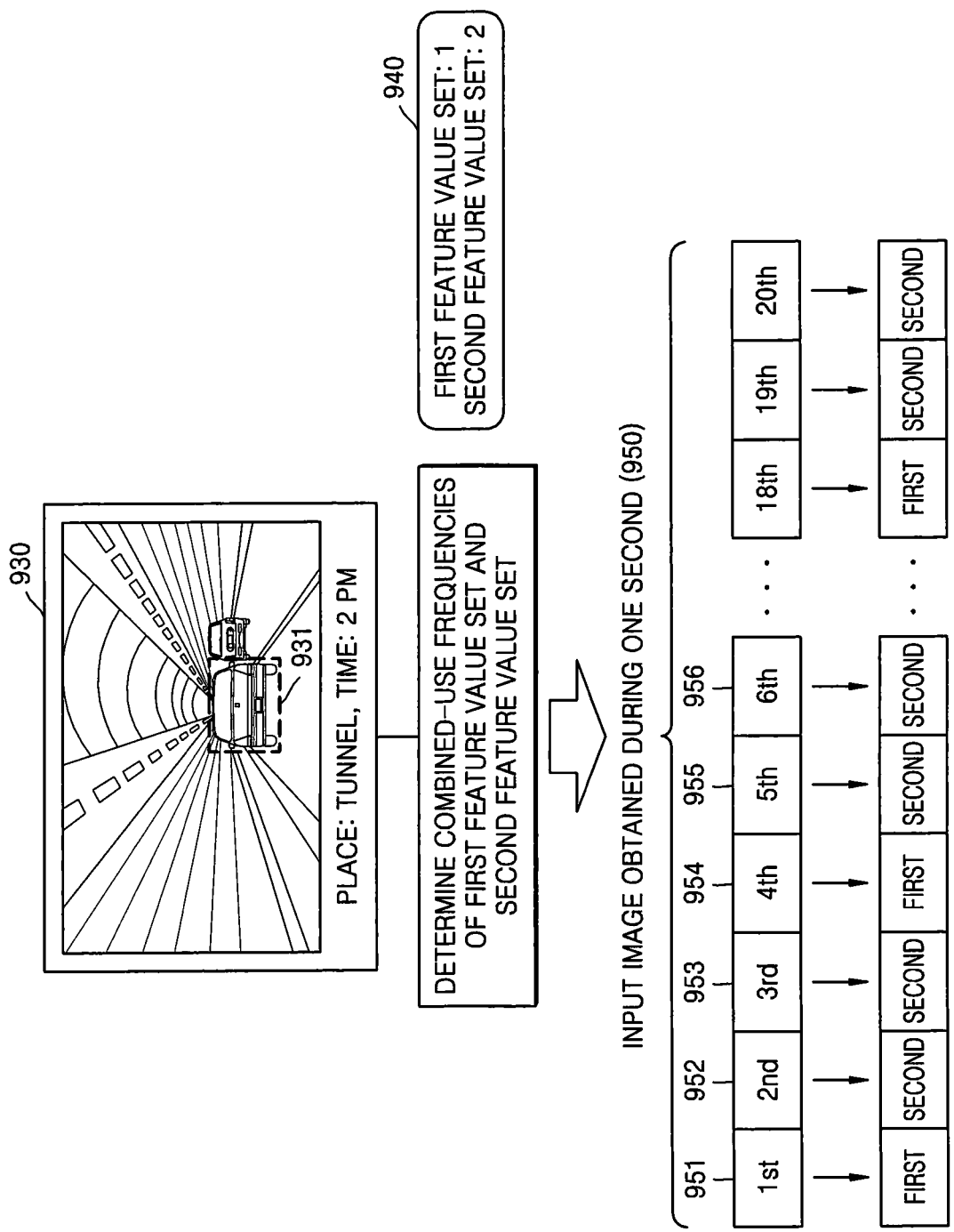

FIGS. 9A and 9B are views showing an example of a device determining different use frequencies of a first feature value set and a second feature value set, according to one or more embodiments.

As described above, the device 1000 according to one or more embodiments may determine use frequencies of the first feature value set and the second feature value set as being different from each other, based on the information about the environment around the device 1000.

Referring to FIG. 9A, an input image 900 captured at 5 PM may be shown as dark and objects 901, 902, and 903 included in the input image 900 may have a color, a shape, and an outline similar to those of an input image captured at night. Here, the device 1000 may determine the use frequencies of the first feature value set and the second feature value set by taking into account information about a time. For example, the device 1000 may increase the use frequency of the second feature value set, as the time in which the input image is obtained is closer to a sunset time. For example, as illustrated in FIG. 9A, the device 1000 may determine (910) the ratio of the use frequencies of the first feature value set and the second feature value set as 2:1.

Referring to FIG. 9A, the device 1000 may obtain, for example, twenty input images (first through twentieth input images) 920 in one second. Also, the device 1000 may recognize objects included in the plurality of input images 920 by using the first feature value set and the second feature value set in a combined way, based on the determined use frequencies. For example, the device 1000 may recognize the objects included in a first input image 921 and a second input image 922 by using the first feature value set and the object included in a third input image 923 by using the second feature value set. Also, the device 1000 may recognize the objects included in a fourth input image 924 and a fifth input image 925 by using the first feature value set and the object included in a sixth input image 926 by using the second feature value set.

Referring to FIG. 9B, an input image 930 captured in a tunnel at 2 PM may be shown as dark and an object 931 included in the input image 930 may have a color, a shape, and an outline similar to those of an input image captured at night, due to low luminance in the tunnel. Here, the device 1000 may determine the use frequencies of the first feature value set and the second feature value set by taking into account the information about a time and a place around the device 1000 that obtains the input image 930. For example, the device 1000 may increase the use frequency of the second feature value set, as the place has a lower luminance, such as in a tunnel or an underground parking lot. For example, referring to FIG. 9B, in the case of an input image captured in a tunnel at 2 PM, the device 1000 may determine (940) the ratio of the use frequencies of the first feature value set and the second feature value set as 2:1.

Referring to FIG. 9B, the device 1000 may obtain, for example, twenty input images (first through twentieth input images) 950 in one second. Also, the device 1000 may recognize objects included in the plurality of input images 950 by using the first feature value set and the second feature value set in a combined way, based on the determined use frequencies. For example, the device 1000 may recognize the object included in a first input image 951 by using the first feature value set and the objects included in a second input image 952 and a third input image 953 by using the second feature value set.

Figure 10:
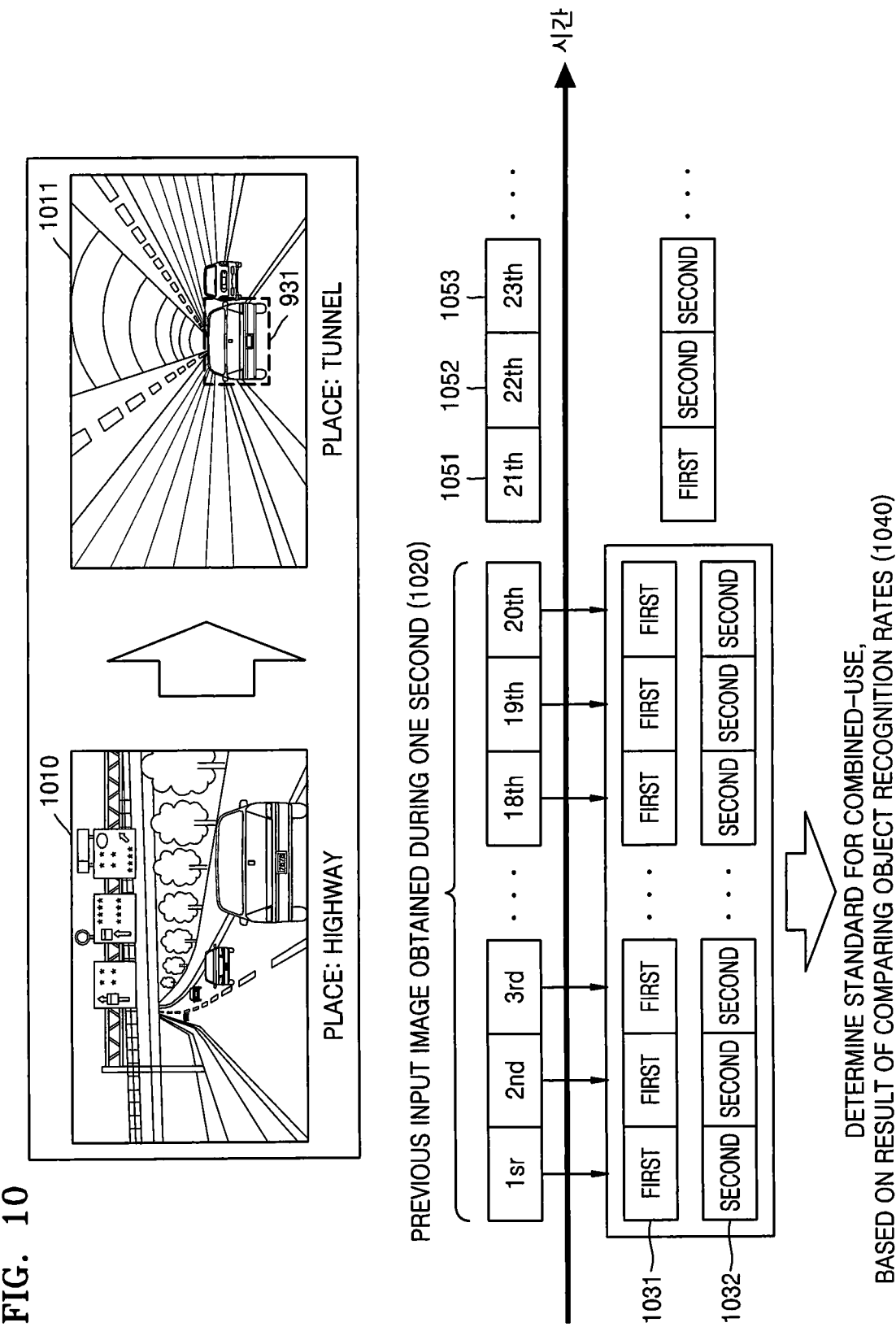
FIG. 10 is a view showing an example of a device comparing an object recognition rate based on a first feature value set with an object recognition rate based on a second feature value set, according to one or more embodiments.

FIG. 10 is a view showing an example of a device comparing an object recognition rate based on a first feature value set with an object recognition rate based on a second feature value set, according to one or more embodiments.

The device 1000 according to one or more embodiments may detect a change in information about an environment around the device 1000. For example, referring to FIG. 10, when a place around the device 1000 is changed from a highway 1010 to a tunnel 1011, the luminance around the device 1000 may be decreased. Here, the device 1000 may change a standard for using the first feature value set and the second feature value set in a combined way, based on the changed information about the environment.

The device 1000 according to one or more embodiments may recognize an object included in at least one previous input image obtained during a certain time, by using each of the first feature value set and the second feature value set. For example, referring to FIG. 10, the device 1000 may recognize an object included in twenty input images 1020 obtained during a second, by using each of a first feature value set 1031 and a second feature value set 1032.

The device 1000 according to one or more embodiments may compare an object recognition rate based on the first feature value set 1031 with an object recognition rate based on the second feature value set 1032. Also, the device 1000 may determine (1040) the standard for using the first feature value set 1031 and the second feature value set 1032 in the combined way, based on a result of comparing the object recognition rates. For example, referring to FIG. 10, in the case of an input image captured in the tunnel 1011, due to the low luminance around the device 1000, the object recognition rate based on the second feature value set 1032 may be higher than the object recognition rate based on the first feature value set 1031. Here, the device 1000 may determine a weight of the second feature value set 1032 to be greater than a weight of the first feature value set 1031 or may determine a use frequency of the second feature value set 1032 to be greater than a use frequency of the first feature value set 1031. However, it is not limited thereto. For example, referring to FIG. 10, the device 1000 may determine (1040) the ratio of the use frequencies of the first feature value set and the second feature value set as 1:2 based on the result of comparing the object recognition rates.

The device 1000 according to one or more embodiments may recognize the object included in the input image by using the first feature value set and the second feature value set based on the determined standard for using the first feature value set and the second feature value set in the combined way. For example, referring to FIG. 10, when the ratio of the use frequencies of the first feature value set and the second feature value set is determined as 1:2, the device 1000 may recognize an object included in a twenty-first input image 1051 by using the first feature value set and objects included in a twenty-second input image 1052 and a twenty-third input image 1053 by using the second feature value set.

Figure 11:
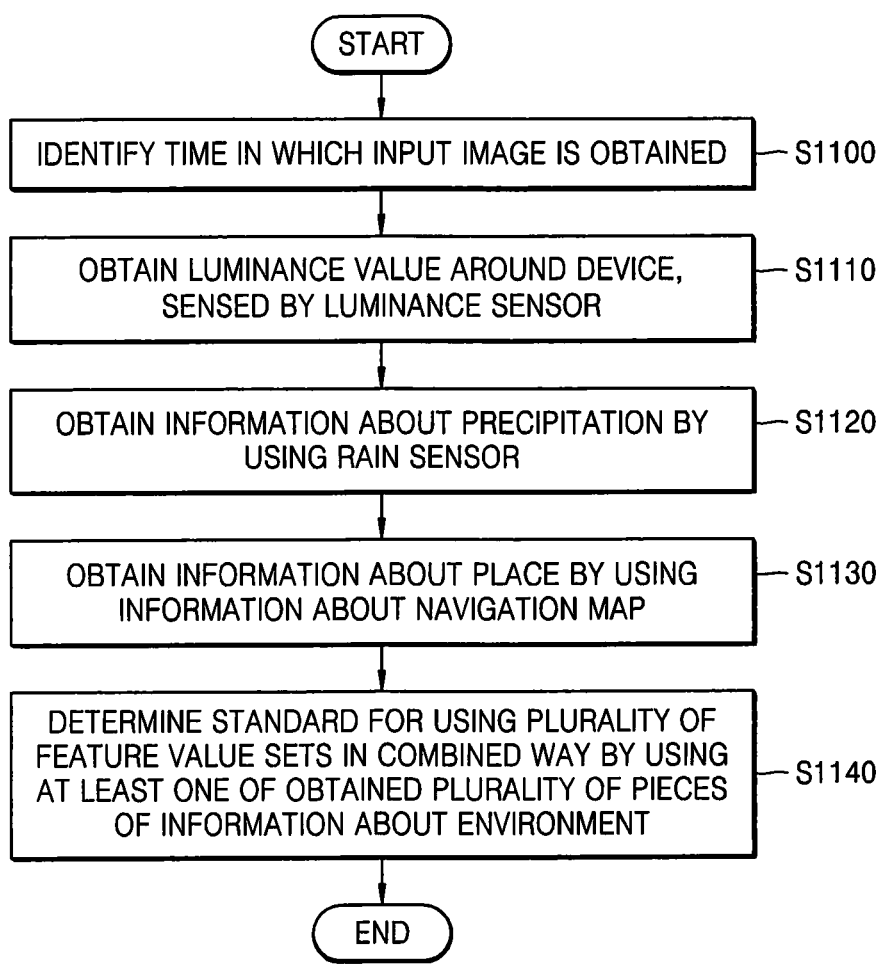
FIG. 11 is a flowchart of a method, performed by a device, of obtaining a plurality of pieces of information about an environment, according to one or more embodiments.

FIG. 11 is a flowchart of a method, performed by a device, of obtaining a plurality of pieces of information about an environment, according to one or more embodiments.

The device 1000 according to one or more embodiments may determine a standard for using a plurality of value sets in a combined way, based on information about an environment around the device 1000.

In operation S1100, the device 1000 may identify a time in which an input image is obtained. For example, the device 1000 may identify whether the input image is captured during the day or at night. Also, the device 1000 may identify at what time over the course of a 24 hour period the input image is captured.

In operation S1110, the device 1000 may obtain a luminance value around the device 1000 by using a luminance sensor. For example, when the luminance value detected by the luminance sensor is equal to or less than a predetermined critical value, the device 1000 may determine that the weather is cloudy or that the place in which the input image is obtained is relatively dark.

In operation S1120, the device 1000 may obtain information about the amount of precipitation. For example, the device 1000 may detect the amount of precipitation by using a rain sensor, but it is not limited thereto.

In operation S1130, the device 1000 may obtain information about a place around the device 1000. For example, the device 1000 may identify whether the place around the device 1000 that obtains the input image, is a dark place, such as a tunnel, an underground parking lot, and a mountain path, by using information about a navigation map.

In operation S1140, the device 1000 may determine the standard for using the plurality of feature value sets in the combined way, based on at least one of the plurality of pieces of information about the environment obtained in operations S1100 through S1130. For example, even when the input image is obtained during the daytime, the input image may be obtained in a place having a low luminance, such as a tunnel or an underground parking lot, or may be obtained in a cloudy day or a rainy day. Here, even when the input image is obtained during the daytime, the input image may be shown to be dark. Thus, the device 1000 may determine the standard for using the plurality of feature value sets in the combined way by further taking into account the information about the weather, the place, etc. around the device 1000, and may use the plurality of feature value sets according to the determined standard for using the plurality of feature value sets in the combined way, so as to recognize the object.

Figure 12:
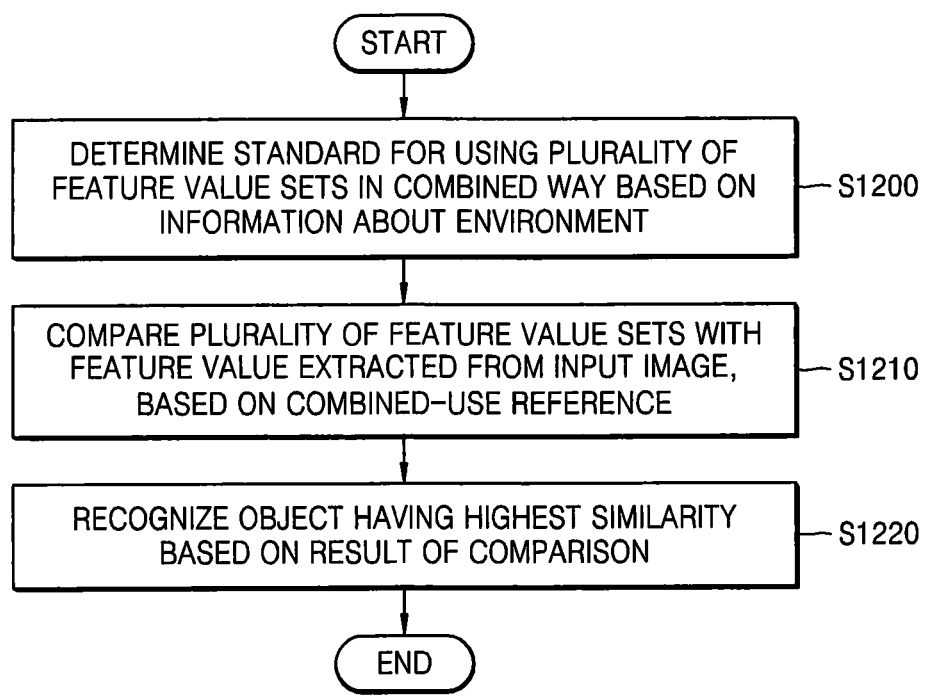
FIG. 12 is a flowchart of a method, performed by a device, of recognizing an object by using a plurality of feature value sets based on a reference of combination, according to one or more embodiments.

FIG. 12 is a flowchart of a method, performed by a device, of recognizing an object by using a plurality of feature value sets based on a reference of combination, according to one or more embodiments.

Referring to FIG. 12, in operation S1200, the device 1000 may determine, based on information about an environment around the device 1000, the standard for using the plurality of feature value sets in the combined way. For example, the plurality of feature value sets may include a first feature value set and a second feature value set. As described above, the device 1000 may determine the standard for using the first feature value set and the second feature value set in the combined way by differently determining the weights of the first feature value set and the second feature value set or differently determining the use frequencies of the first feature value set and the second feature value set. However, it is not limited thereto.

In operation S1210, the device 1000 may compare the plurality of feature value sets with feature values extracted from an input image, according to the standard for using the plurality of feature value sets in the combined way. For example, the device 1000 may determine the plurality of feature value sets to identify various objects, based on a result of learning. Also, the device 1000 may extract the feature value of at least one object included in the input image. For example, the device 1000 may extract the feature value of the object included in the input image, by using information about a color, an outline, a brightness, etc. of the input image. Also, the device 1000 may compare the plurality of feature value sets with the feature value extracted from the input image, according to the standard for using the plurality of feature value sets in the combined way.

In operation S1220, the device 1000 may recognize the object having the highest similarity, based on a result of the comparison.

Figure 13:
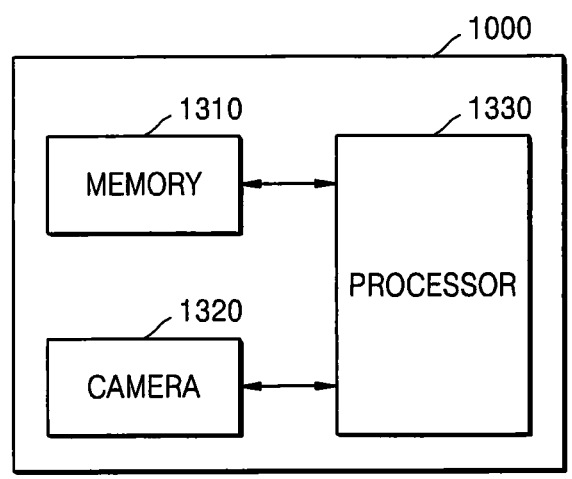
FIGS. 13 and 14 are block diagrams of a device according to one or more embodiments.
Figure 14:
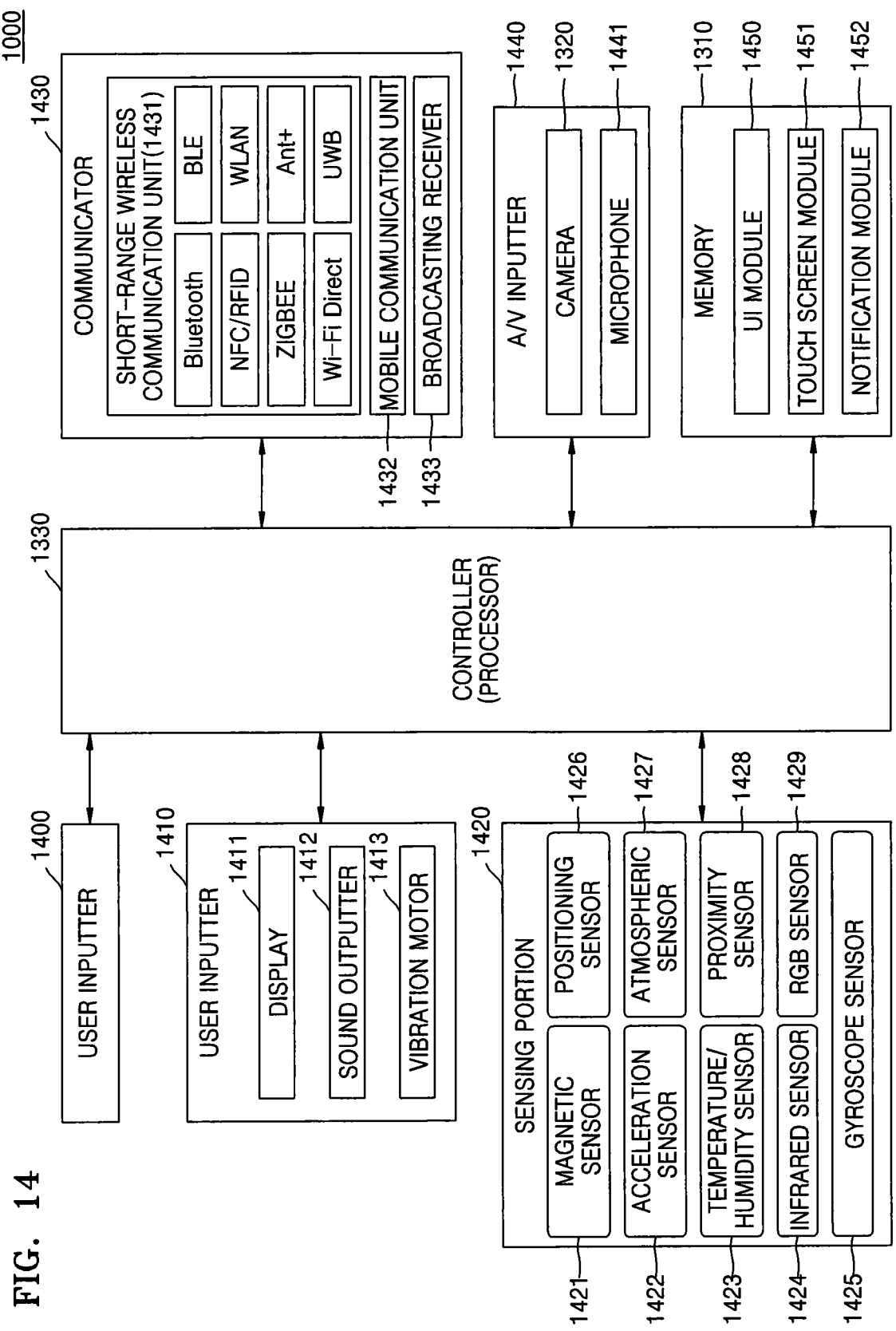

FIGS. 13 and 14 are block diagrams of a device according to one or more embodiments.

As illustrated in FIG. 13, the device 1000 according to one or more embodiments may include a memory 1310, a camera 1320, and a processor 1330.

However, not all illustrated components of FIG. 13 are essential components of the device 1000. The device 1000 may be realized by including more components than the components illustrated in FIG. 13 or less components than the components illustrated in FIG. 13. For example, as illustrated in FIG. 4, the device 1000 according to one or more embodiments may further include a user inputter 1400, an outputter 1410, a sensing portion 1420, a communicator 1430, and an A/V inputter 1440, in addition to a memory 1310, a camera 1320, and a processor 1330.

The processor 1330 may generally control general operations of the device 1000. For example, the processor 1330 may generally control the user inputter 1400, the outputter 1410, the sensing portion 1420, the communicator 1430, the A/V inputter 1440, etc. by executing programs stored in the memory 1310. Also, the processor 1330 may perform the functions of the device 1000 described with reference to FIGS. 1 through 12, by executing the programs stored in the memory 1310.

The processor 1330 according to one or more embodiments may obtain an input image by controlling a camera capturing an environment around the device 1000. The obtained input image may include at least one object and the at least one object may include, but is not limited to, external vehicles, motorcycles, traffic lanes, buildings, human beings, animals, objects, etc., around the device 1000.

The processor 1330 according to one or more embodiments may obtain information about the environment around the device 1000 that obtains the input image. The information about the environment may include information about a time, the weather, a place, a brightness, etc. related to the device 1000, but is not limited thereto.

The processor 1330 according to one or more embodiments may determine, based on the information about the environment, a standard for using a plurality of feature value sets in a combined way. The feature value set may be a set of feature values for identifying each object included in the input image and the feature value set may include information about at least one of an outline, a brightness, and a color of the object. The plurality of feature value sets may include a first feature value set and a second feature value set. For example, the first feature value set may be used for an input image captured during the daytime and the second feature value set may be used for an input image captured at night. However, it is not limited thereto. The device 1000 may determine, based on the information about the environment, the standard for using the plurality of feature value sets in the combined way to use the first feature value set and the second feature value set.

The device 1000 according to one or more embodiments may differently determine weights of the first feature value set and the second feature value set based on the information about the environment around the device 1000. Also, the device 1000 according to one or more embodiments may differently determine use frequencies of the first feature value set and the second feature value set based on the information about the environment around the device 1000.

Also, the device 1000 may recognize an object included in at least one previous input image obtained during a certain time before the input image is obtained, by using each of the first feature value set and the second feature value set. Also, the device 1000 may compare an object recognition result based on the first feature value set with an object recognition result based on the second feature value set and may determine, based on a result of the comparison, the standard for using the first feature value set and the second feature value set in the combined way.

The device 1000 according to one or more embodiments may recognize the object included in the input image by using the plurality of feature value sets based on the determined standard for using the first feature value set and the second feature value set in the combined way. For example, the device 1000 may compare the first feature value set and the second feature value set with a feature value extracted from the input image, according to the determined standard for using the first feature value set and the second feature value set in the combined way. Also, the device 1000 may recognize the object having the highest similarity, based on a result of the comparison. However, it is not limited thereto.

Also, the processor 1330 may recognize the object included in the input image by using a data recognition model stored in the memory 1310 or a server, and this aspect will be described in more detail with reference to FIGS. 15 through 18.

Also, the processor 1330 may efficiently learn a standard for recognizing the object included in the input image, by using the data recognition model stored in the memory 1310 or the server and provide an object recognition result according to a result of the learning.

The memory 1310 may store the programs for processing and controlling of the processor 1330 and may store data input to the device 1000 or output from the device 1000. For example, the memory 1310 may store at least one program to obtain an input image by capturing an environment around the device, obtain information about the environment around the device that obtains the input image, determine, based on the information about the environment, a standard for using a plurality of feature value sets in a combined way, and use the plurality of feature value sets based on the determined standard for using the plurality of feature value sets in the combined way so as to recognize an object included in the input image.

The memory 1310 may include at least one of various types of storage media, such as a flash memory type, a hard-disk type, a multi-media card micro-type, a card-type memory (for example, an SD or XD memory, etc.), random access memory (RAM), static random access memory (SRAM), read-only memory (ROM), electrically-erasable programmable read-only memory (EEPROM), programmable read-only memory (PROM), a magnetic memory, a magnetic disk, and an optical disk.

The programs stored in the memory 1310 may be divided into a plurality of modules according to their functions. For example, the programs may be divided into a UI module 1450, a touch screen module 1451, a notification module 1452, etc.

The UI module 1450 may provide a specialized UI, a GUI, etc. associated with the device 1000 for each application. The touch screen module 1451 may sense a touch gesture of a user on the touch screen and transmit information about the touch gesture to the processor 1330. The touch screen module 1451 according to one or more embodiments may recognize and analyze a touch code.

The notification module 1452 may generate a signal for notifying the occurrence of an event of the device 1000. Examples of the event occurring in the device 1000 may include reception of a call signal, reception of a message, an input of a key signal, notification of a schedule, etc. The notification module 1452 may output the notification signal as a video signal through the display 1411, may output the notification signal in as an audio signal through the sound outputter 1412, or may output the notification signal as a vibration signal through the vibration motor 1413.

The camera 1320 may obtain the input image by capturing the environment around the device. The image captured by an image sensor may be processed by the processor 1330 or an additional image processor (not shown). The image captured by the camera 1320 may be used to recognize an object around the device 1000.

The user inputter 1400 denotes a means used by a user to input data for controlling the device 1000. For example, the user inputter 1400 may include a keypad, a dome switch, a touch pad (a touch capacitance method, a pressure resistance method, an infrared sensing method, a surface ultrasonic conductive method, an integral tension measuring method, a piezoelectric effect method, etc.), a jog wheel, a jog switch, etc. However, it is not limited thereto.

The outputter 1410 may output an audio signal, a video signal, or a vibration signal, and the outputter 1410 may include the display 1411, the sound outputter 1412, and the vibration motor 1413.

The display 1411 may display information processed by the device 1000. For example, the display 1411 according to one or more embodiments may display the object recognition result obtained by using the plurality of feature value sets. Also, the display 1411 may display a predetermined notification message based on the object recognition result.

The sound outputter 1412 may output audio data received from the communicator 1430 or stored in the memory 1310. Also, the sound outputter 1412 may output a sound signal (for example, a call signal reception sound, a message reception sound, and a notification sound) associated with the functions performed by the device 1000.

The sensing portion 1420 may sense a state of the device 1000 or a state around the device 1000 and transmit the sensed information to the processor 1330. The sensing portion 1420 may be used to generate part of context information indicating a situation around a user or the device 1000.

The sensing portion 1420 may include at least one of a magnetic sensor 1421, an acceleration sensor 1422, a temperature/humidity sensor 1423, an infrared sensor 1424, a luminance sensor 1425, a positioning sensor (for example, a GPS) 1426, a rain sensor 1427, a proximity sensor 1428, and an RGB sensor (a luminance sensor) 1429, but is not limited thereto. A function of each sensor may be intuitively inferred by one of ordinary skill in the art based on its name, and thus, its detailed description will not be given.

The communicator 1430 may include one or more components configured to enable the device 1000 to communicate with another device (not shown) or a server. For example, the communicator 1430 may include a short-range wireless communication unit 1431, a mobile communication unit 1432, and a broadcasting receiver 1433.

The short-range wireless communication unit 1431 may include a Bluetooth communicator, a Bluetooth low energy (BLE) communicator, a near field communication unit, a WLAN (Wi-Fi) communicator, a Zigbee communicator, an infrared data association (IrDA) communicator, a Wi-fi direct (WFD) communicator, a ultrawide band (UWB) communicator, an Ant+ communicator, etc., but is not limited thereto.

The mobile communication unit 1432 may transceive wireless signals with at least one of a base station, an external terminal, and a server, via a mobile communication network.

The broadcasting receiver 1433 may receive broadcasting signals and/or broadcasting-related information from the outside through broadcasting channels.

The audio/video (A/V) inputter 1440 may be configured to input an audio signal or a video signal and may include a microphone 1441, etc., as well as the camera 1320.

The microphone 1441 may receive a sound signal from the outside and process the received sound signal into electrical sound data. For example, the microphone 1441 may receive the sound signal from an external device or a user. The microphone 1441 may receive a voice input of the user.

Figure 15:
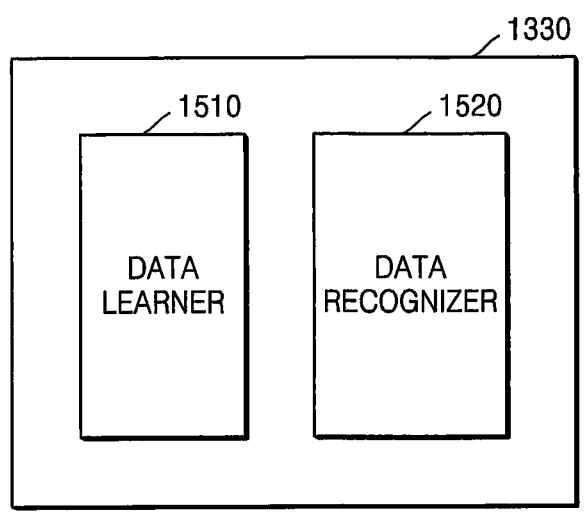
FIG. 15 is a block diagram of a processor according to one or more embodiments.

FIG. 15 is a block diagram of a processor according to one or more embodiments.

Referring to FIG. 15, the processor 1330 according to one or more embodiments may include a data learner 1510 and a data recognizer 1520.

The data learner 1510 may learn a standard for recognizing an object included in an input image. For example, the data learner 1510 may learn a feature value of an object, which is used to recognize the object. The data learner 1510 may learn the standard for recognizing the object included in the input image by obtaining data to be used for learning and applying the obtained data to a data recognition model to be described below.

The data recognizer 1520 may identify the object included in the input image based on data. For example, the data recognizer 1520 may recognize the object included in the input image by using a result of learning with respect to the feature value of the object. The data recognizer 1520 may obtain certain data based on a reference predetermined based on learning and use the data recognition model with the obtained data as an input value. Also, the data recognizer 1520 may use the data recognition model to recognize the object included in the input image based on the certain data. Also, a result value output by the data recognition model with the obtained data as the input value may be used to modify and refine the data recognition model.

At least one of the data learner 1510 and the data recognizer 1520 may be formed in the form of at least one hardware chip and mounted in an electronic apparatus. For example, at least one of the data learner 1510 and the data recognizer 1520 may be formed in the form of an exclusive hardware chip for AI or may be formed as part of a previous general-purpose processor (for example, a central processing unit (CPU) or an application processor) or a graphics exclusive processor (for example, a graphics processing unit (GPU)) and mounted in various electronic apparatuses described above.

In this case, the data learner 1510 and the data recognizer 1520 may be mounted in one electronic apparatus or each may be mounted in a different electronic apparatus. For example, one of the data learner 1510 and the data recognizer 1520 may be included in the electronic apparatus and the other may be included in a server. Also, the data learner 1510 and the data recognizer 1520 may communicate with each other in a wired or wireless manner to provide model information established by the data learner 1510 to the data recognizer 1520 or provide data input into the data recognizer 1520 to the data learner 1510 as additional learning data.

At least one of the data learner 1510 and the data recognizer 1520 may be realized as a software module.

When the at least one of the data learner 1510 and the data recognizer 1520 is realized as the software module (or a program module including an instruction), the software module may be stored in a non-transitory computer readable recording medium. Also, in this case, the at least one software module may be provided by an operating system (OS) or a certain application. Alternatively, a portion of the at least one software module may be provided by the OS and the other portion of the at least one software module may be provided by a certain application.

Figure 16:
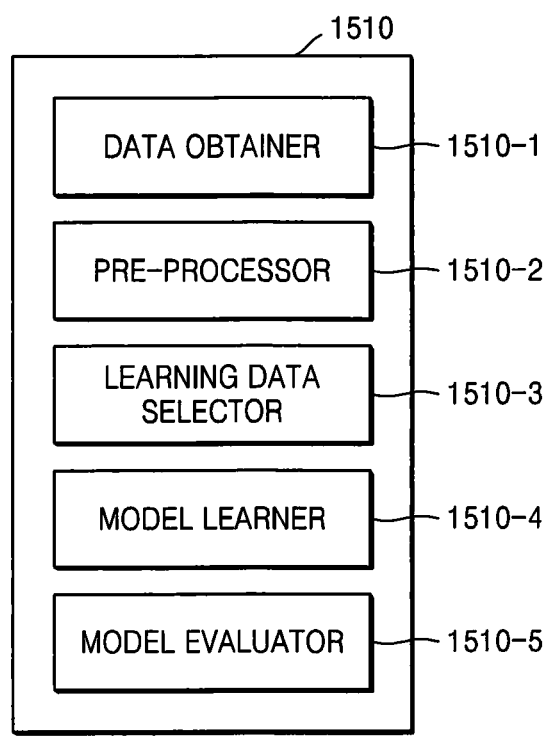
FIG. 16 is a block diagram of a data learner according to one or more embodiments.

FIG. 16 is a block diagram of a data learner according to one or more embodiments.

Referring to FIG. 16, the data learner 1510 according to one or more embodiments may include a data obtainer 1510-1, a pre-processor 1510-2, a learning data selector 1510-3, a model learner 1510-4, and a model evaluator 1510-5.

The data obtainer 1510-1 may obtain data required for recognizing an object included in an input image. For example, the data obtainer 1510-1 may sense an environment around the device 1000 to obtain data.

The data obtainer 1510-1 may obtain at least one of an image and a video. For example, the data obtainer 1510-1 may obtain the at least one of the image and the video by using a camera of the device 1000 including the data learner 1510.

The pre-processor 1510-2 may pre-process the obtained data so that the obtained data may be used for learning for recognizing the object included in the input image. The pre-processor 1510-2 may process the obtained data into a predetermined format so that the model learner 1510-4 to be described below may use the obtained data for learning for identifying the object included in the input image.

The learning data selector 1510-3 may select the data required for learning from the pre-processed data. The selected data may be provided to the model learner 1510-4. The learning data selector 1510-3 may select the data required for learning from the pre-processed data based on a predetermined standard for recognizing the object included in the input image. Also, the learning data selector 1510-3 may select the data based on a reference predetermined by learning of the model learner 1510-4 to be described below.

The model learner 1510-4 may learn a reference as to how to recognize the object included in the input image based on the learning data. Also, the model learner 1510-4 may learn a reference as to which learning data is to be used for recognizing the object included in the input image. For example, the model learner 1510-4 may learn a feature value for identifying each object, included in the learning data.

Also, the model learner 1510-4 may train the data recognition model used to recognize the object included in the input image by using the learning data. In this case, the data recognition model may be a pre-established model. For example, the data recognition model may be the model pre-established by receiving basic learning data (for example, sample data, etc.).

The data recognition model may be established by taking into account an application field of the recognition model, the purpose of learning, or the computer performance of a device. The data recognition model may be, for example, a model based on a neural network. For example, models, such as a deep neural network (DNN), a recurrent neural network (RNN), and a bidirectional recurrent deep neural network (BRDNN), may be used as the data recognition model, but it is not limited thereto.

According to various embodiments, when there are a plurality of pre-established data recognition models, the model learner 1510-4 may determine a data recognition model having a great relevance between input learning data and basic learning data as the data recognition model for learning. In this case, the basic learning data may be pre-classified into types of the data and the data recognition model may be pre-established for the types of the data. For example, the basic learning data may be pre-classified based on various references, such as a region in which the learning data is generated, a time in which the learning data is generated, a size of the learning data, a genre of the learning data, a generator of the learning data, a type of an object in the learning data, etc.

Also, the model learner 1510-4 may train the data recognition model by using, for example, learning algorithms, such as error back-propagation and gradient descent.

Also, the model learner 1510-4 may train the data recognition model, for example, through supervised learning in which the learning data is used as an input value. Also, the model learner 1510-4 may train the data recognition model, for example, through unsupervised learning based on which the type of the data required for recognizing the object included in the input image is self-trained without a particular instruction to discover a standard for recognizing the object included in the input image. Also, the model learner 1510-4 may train the data recognition model, for example, through reinforcement learning based on which feedback about whether a result of recognizing the object based on learning is correct or not is used.

Also, when the data recognition model is trained, the model learner 1510-4 may store the trained data recognition model. In this case, the model learner 1510-4 may store the trained data recognition model on the memory of the electronic apparatus including the data recognizer 1520. Alternatively, the model learner 1510-4 may store the trained data recognition model on the memory of the electronic apparatus including the data recognizer 1520 to be described below. Alternatively, the model learner 1510-4 may store the trained data recognition model on a memory of a server connected with the electronic apparatus in a wired or wireless network.

In this case, the memory on which the trained data recognition model is stored may also store, for example, commands or data related to at least another component of the electronic apparatus. Also, the memory may store software and/or programs. The programs may include, for example, kernel, middleware, an application programming interface (API) and/or an application program (or an "application").

The model evaluator 1510-5 may input evaluation data in the data recognition model and when a recognition result output from the evaluation data does not meet a predetermined reference, may have the model learner 1510-4 re-learn. In this case, the evaluation data may be the data predetermined for evaluating the data recognition model.

For example, the model evaluator 1510-5 may evaluate that the recognition result does not meet the predetermined reference, when the number of pieces of the evaluation data for which the recognition result is not correct or the rate of the evaluation data for which the recognition result is not correct exceeds a predetermined critical value, from among recognition results of the trained data recognition model with respect to the evaluation data. For example, when the predetermined reference is defined as 2% and when the trained data recognition model outputs incorrect recognition results with respect to the pieces of evaluation data that are more than twenty (20) out of the total one thousand (1,000)

pieces of evaluation data, the model evaluator 1510-5 may evaluate that the trained data recognition model is not appropriate.

Meanwhile, when there are a plurality of trained data recognition models, the model evaluator 1510-5 may evaluate whether each of the trained data recognition models meets a predetermined reference and may determine the model meeting the predetermined reference as the final data recognition model. In this case, when there are a plurality of models meeting the predetermined reference, the model evaluator 1510-5 may determine one predetermined model or a predetermined number of models as the final data recognition models, based on the order of the score of the evaluation.

Meanwhile, at least one of the data obtainer 1510-1, the pre-processor 1510-2, the learning data selector 1510-3, the model learner 1510-4, and the model evaluator 1510-5 in the data learner 1510 may be formed in the form of at least one hardware chip and may be mounted in the electronic apparatus. For example, at least one of the data obtainer 1510-1, the pre-processor 1510-2, the learning data selector 1510-3, the model learner 1510-4, and the model evaluator 1510-5 may be formed in the form of an exclusive hardware chip for AI, or may be formed as a part of a previous general-purpose processor (for example, a CPU or an application processor) or a graphics exclusive processor (for example, a GPU) and may be mounted in various electronic apparatuses described above.

Also, the data obtainer 1510-1, the pre-processor 1510-2, the learning data selector 1510-3, the model learner 1510-4, and the model evaluator 1510-5 may be mounted in one electronic apparatus or each may be mounted in a separate electronic apparatus. For example, some of the data obtainer 1510-1, the pre-processor 1510-2, the learning data selector 1510-3, the model learner 1510-4, and the model evaluator 1510-5 may be included in the electronic apparatus and the others may be included in a server.

Also, at least one of the data obtainer 1510-1, the pre-processor 1510-2, the learning data selector 1510-3, the model learner 1510-4, and the model evaluator 1510-5 may be realized as a software module. When the at least one of the data obtainer 1510-1, the pre-processor 1510-2, the learning data selector 1510-3, the model learner 1510-4, and the model evaluator 1510-5 is realized as the software module (or a program module including an instruction), the software module may be stored in a non-transitory computer readable recording medium. Also, in this case, the at least one software module may be provided by an operating system (OS) or a certain application. Alternatively, a portion of the at least one software module may be provided by the OS and the other portion of the at least one software module may be provided by a certain application.

The processor 1330 may use various data recognition models and may determine an intent of a user, provide related information, and efficiently learn a standard for recommending a substituting operation, based on various methods through the data recognition models.

Figure 17:
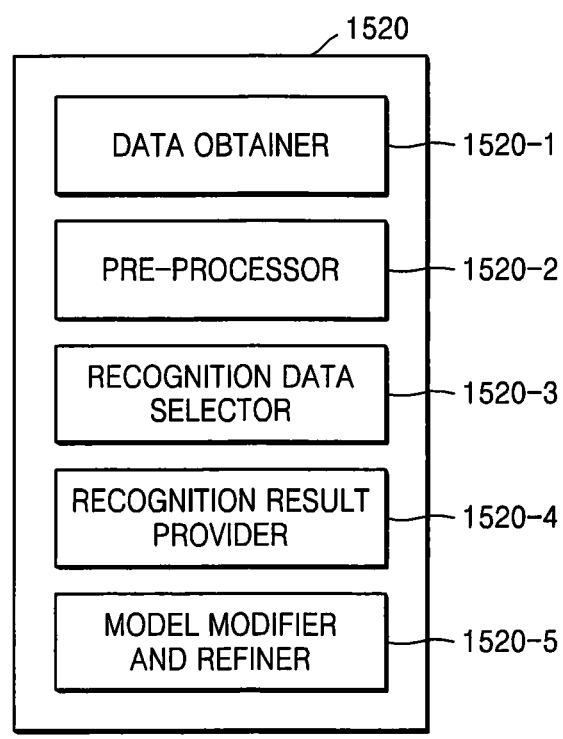
FIG. 17 is a block diagram of a data recognizer according to one or more embodiments.

FIG. 17 is a block diagram of a data recognizer according to one or more embodiments.

Referring to FIG. 17, the data recognizer 1520 according to one or more embodiments may include a data obtainer 1520-1, a pre-processor 1520-2, a recognition data selector 1520-3, a recognition result provider 1520-4, and a model modifier and refiner 1520-5.

The data obtainer 1520-1 may obtain data required for identifying an object included in an input image and the pre-processor 1520-2 may pre-process the obtained data so that the obtained data may be used for identifying the object included in the input image. The pre-processor 1520-2 may process the obtained data into a predetermined format so that the recognition result provider 1520-4 to be described below may use the obtained data to identify the object included in the input image.

The recognition data selector 1520-3 may select data required for recognizing the object included in the input image from the pre-processed data. The selected data may be provided to the recognition result provider 1520-4. The recognition data selector 1520-3 may select part or all of the pre-processed data according to a predetermined standard for recognizing the object included in the input image. Also, the recognition data selector 1520-3 may select the data according to a reference predetermined based on learning by the model learner 1510-4 to be described below.

The recognition result provider 1520-4 may recognize the object included in the input image, by applying the selected data to the data recognition model. The recognition result provider 1520-4 may provide the recognition result according to the purpose of data recognition. The recognition result provider 1520-4 may apply the selected data to the data recognition model by using the data selected by the recognition data selector 1520-3 as an input value. Also, the recognition result may be determined by the data recognition model.

The model modifier and refiner 1520-5 may allow the data recognition model to be modified and refined based on the evaluation about the recognition result provided by the recognition result provider 1520-4. For example, the model modifier and refiner 1520-5 may provide the recognition result provided by the recognition result provider 1520-4 to the model learner 1510-4 to allow the model learner 1510-4 to modify and refine the data recognition model.

Meanwhile, at least one of the data obtainer 1520-1, the pre-processor 1520-2, the recognition data selector 1520-3, the recognition result provider 1520-4, or the model modifier and refiner 1520-5 in the data recognizer 1520 may be formed in the form of at least one hardware chip and may be mounted in an electronic apparatus. For example, at least one of the data obtainer 1520-1, the pre-processor 1520-2, the recognition data selector 1520-3, the recognition result provider 1520-4, or the model modifier and refiner 1520-5 may be formed in the form of an exclusive hardware chip for AI or may be formed as a part of a previous general-purpose processor (for example, a CPU or an application processor) or a graphics exclusive processor (for example, a GPU) and may be mounted in various electronic apparatuses described above.

Also, the data obtainer 1520-1, the pre-processor 1520-2, the recognition data selector 1520-3, the recognition result provider 1520-4, and the model modifier and refiner 1520-5 may be mounted in one electronic apparatus or each may be mounted in a separate electronic apparatus. For example, some of the data obtainer 1520-1, the pre-processor 1520-2, the recognition data selector 1520-3, the recognition result provider 1520-4, and the model modifier and refiner 1520-5 may be included in electronic apparatus and the others may be included in a server.

Also, at least one of the data obtainer 1520-1, the pre-processor 1520-2, the recognition data selector 1520-3, the recognition result provider 1520-4, or the model modifier and refiner 1520-5 may be realized as a software module. When the at least one of the data obtainer 1520-1, the pre-processor 1520-2, the recognition data selector 1520-3, the recognition result provider 1520-4, or the model modifier and refiner 1520-5 is realized as a software module (or a program module including an instruction), the software module may be stored in a non-transitory computer readable recording medium. Also, in this case, the at least one software module may be provided by an operating system (OS) or a certain application. Alternatively, a portion of the at least one software module may be provided by the OS and the other portion of the at least one software module may be provided by a certain application.

Also, the device 1000 may provide services corresponding to an intention of a user to the user by using the data recognition model to which a result of learning is applied.

Figure 18:
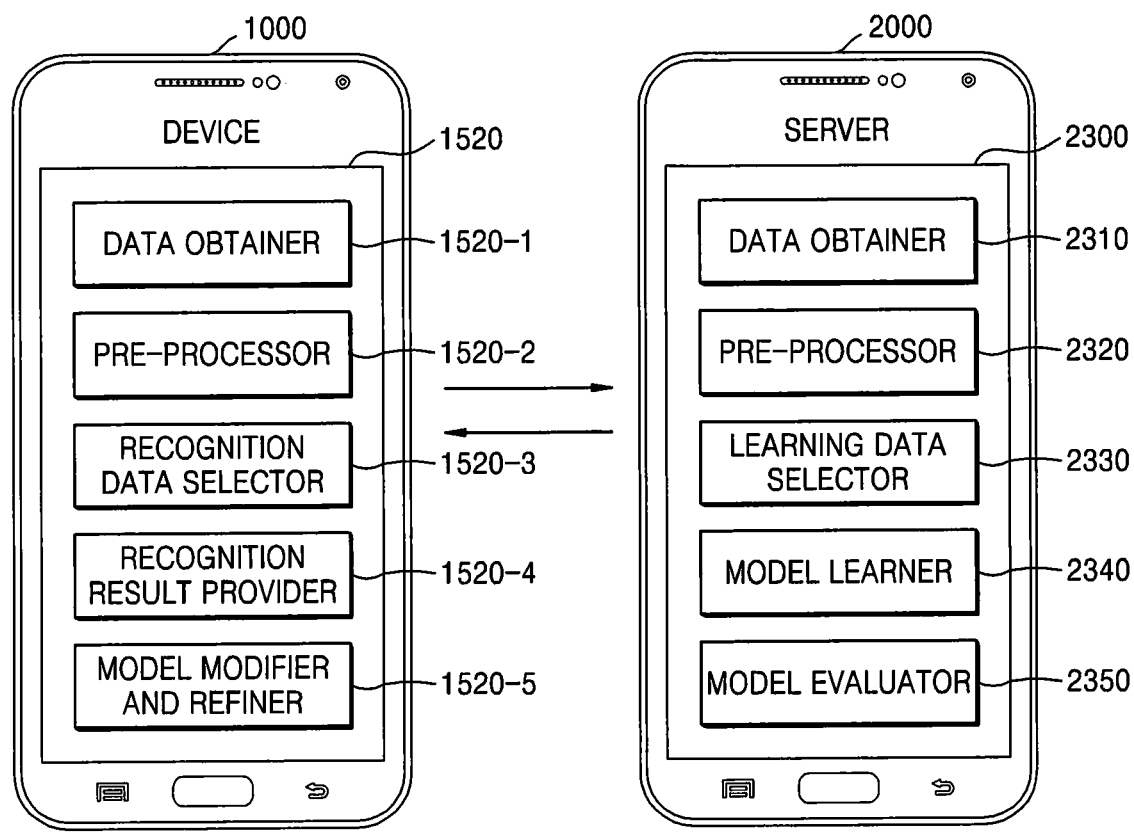
FIG. 18 is a view showing an example in which a device and a server learn and recognize data by interworking with each other, according to one or more embodiments.

FIG. 18 is a view showing an example in which a device and a server learn and recognize data by interworking with each other, according to one or more embodiments.

Referring to FIG. 18, a server 2000 may learn a standard for recognizing an object included in an input image. For example, the server 2000 may learn a feature value of the object that is used to recognize the object. The server 2000 may learn the standard for recognizing the object included in the input image by obtaining data to be used for learning and applying the obtained data to a data recognition model to be described below. The device 1000 may determine an intent of a user, provide related information, and recommend a substituting operation based on a result of the learning of the server 2000.

In this case, a model learner 2340 of the server 2000 may perform the function of the data learner 1510 illustrated in FIG. 13. The model learner 2340 of the server 2000 may learn a reference as to which data is to be used for recognizing the object included in the input image. Also, the model learner 2340 may learn a reference as to how to recognize the object included in the input image by using the data. The model learner 2340 may learn the standard for recognizing the object included in the input image by obtaining data to be used for learning and applying the obtained data to a data recognition model to be described below.

Also, the recognition result provider 1520-4 of the device 1000 may recognize the object included in the input image by applying data selected by the recognition data selector 1520-3 to the data recognition model generated by the server 2000. For example, the recognition result provider 1520-4 may transmit the data selected by the recognition data selector 1520-3 to the server 2000 and may request the server 2000 to recognize the object included in the input image by applying the data selected by the recognition data selector 1520-3 to the recognition model. Also, the recognition result provider 1520-4 may receive information about the recognition of the object determined by the server 2000 from the server 2000.

Alternatively, the recognition result provider 1520-4 of the device 1000 may receive the recognition model generated by the server 2000 from the server 2000 and may recognize the object included in the input image by using the received recognition model. In this case, the recognition result provider 1520-4 of the device 1000 may apply the data selected by the recognition data selector 1520-3 to the data recognition model received from the server 2000 to recognize the object included in the input image.

The one or more embodiments may be embodied as a recording medium including instructions executable by a computer, such as program modules executed by computers. The computer-readable medium may include any usable medium that may be accessed by computers and may include volatile and non-volatile media, and detachable and non-detachable media. Also, the computer-readable medium may include a computer storage medium and a communication medium. The computer storage medium may include all of volatile and non-volatile media, and detachable and non-detachable media which are realized based on any methods and technologies to store information including computer-readable instructions, data structures, program modules, or other data. The communication medium may typically include computer-readable instructions, data structures, program modules, other data of modified data signals, such as carrier waves, other transmission mechanisms, or other information transmission media.

Also, in this specification, the term "unit" may be a hardware component, such as a processor or a circuit, and/or a software component executed by the hardware component, such as the processor.

While the embodiments of the disclosure have been described in detail, it will be understood by one of ordinary skill in the art that various changes in form and details may be made therein without departing from the spirit and scope of the disclosure as defined by the following claims. Therefore, the embodiments described herein should be understood as examples in all aspects and should not be construed as limitations. For example, each of components described as a single unit may be executed in a distributed fashion, and likewise, components described as being distributed may be executed in a combined fashion.

The scope of the disclosure is defined by the appended claims, rather than the detailed description above, and it will be understood that all of the modified or changed forms derived from the meaning and the scope of the claims and the equivalents thereof are encompassed within the range of the disclosure.

The invention claimed is:

1. A device for recognizing an object included in an image, the device comprising:
 a memory in which at least one instruction is stored;
 a camera;
 at least one sensor; and
 at least one processor configured to execute the at least one instruction to:
 obtain, through the camera, the image including the object;
 obtain information, sensed through the at least one sensor, about an environment around the camera that obtained the image;
 determine, based on the obtained information about the environment around the camera that obtained the image, a standard for using a plurality of feature value sets in a combined way to recognize the object included in the obtained image; and
 recognize the object included in the obtained image, by using the plurality of feature value sets based on the determined standard for using the plurality of feature value sets in the combined way.

2. The device of claim 1, wherein the plurality of feature value sets comprise a first feature value set and a second feature value set, and
 wherein determining the standard for using the plurality of feature value sets in the combined way comprises determining, based on the obtained information about the environment, a standard for using the first feature value set and the second feature value set.

3. The device of claim 2, wherein determining the standard for using the plurality of feature value sets in the combined way comprises determining, based on the obtained information about the environment, use frequencies of the first feature value set and the second feature value set to be different from each other.

4. The device of claim 2, wherein determining the standard for using the plurality of feature value sets in the combined way comprises determining, based on the obtained information about the environment, a weight of each of the first feature value set and the second feature value set, and
    wherein recognizing the object included in the obtained image comprises:
    respectively applying the weight of the first feature value set and the weight of the second feature value set to a first object recognition result obtained by using the first feature value set and a second object recognition result obtained by using the second feature value set; and
    recognizing the object included in the obtained image, based on an object recognition result determined based on the first object recognition result to which the weight of the first feature value set is applied and the second object recognition result to which the weight of the second feature value set is applied.

5. The device of claim 2, wherein determining the standard for using the plurality of feature value sets in the combined way comprises:
    recognizing, by using the first feature value set and the second feature value set, an object included in at least one previous image obtained during a time before the image is obtained;
    comparing an object recognition rate based on the first feature value set with an object recognition rate based on the second feature value set; and
    determining, based on a result of the comparison, the standard for using the first feature value set and the second feature value set.

6. The device of claim 1, wherein the obtained information about the environment, sensed through the at least one sensor, comprises at least one of information about a time when the image is obtained through the camera, information about the weather when the image is obtained through the camera, and information about a place where the image is obtained through the camera.

7. The device of claim 1, wherein recognizing the object included in the obtained image comprises:
    comparing the plurality of feature value sets with a feature value extracted from the obtained image, based on the determined standard for using the plurality of feature value sets in the combined way; and
    recognizing an object having a highest degree of similarity as the object, based on a result of the comparison.

8. The device of claim 1, wherein the feature value sets comprise at least one of information about an outline of the object, information about a brightness of the object, and information about a color of the object.

9. A method, performed by a device, of recognizing an object included in an image, the method comprising:
    obtaining, through a camera, the image including the object;
    obtaining information, sensed through at least one sensor, about an environment around the camera that obtained the image;
    determining, based on the obtained information about the environment around the camera that obtained the image, a standard for using a plurality of feature value sets in a combined way to recognize the object included in the obtained image; and
    recognizing the object included in the obtained image, by using the plurality of feature value sets based on the determined standard for using the plurality of feature value sets in the combined way.

10. The method of claim 9, wherein the plurality of feature value sets comprise a first feature value set and a second feature value set, and
    wherein determining the standard for using the plurality of feature value sets in the combined way comprises determining, based on the obtained information about the environment, a standard for using the first feature value set and the second feature value set.

11. The method of claim 10, wherein determining the standard for using the plurality of feature value sets in the combined way comprises determining, based on the obtained information about the environment, use frequencies of the first feature value set and the second feature value set to be different from each other.

12. The method of claim 10, wherein determining the standard for using the plurality of feature value sets in the combined way comprises determining, based on the obtained information about the environment, a weight of each of the first feature value set and the second feature value set, and
    wherein recognizing the object included in the obtained image comprises:
    respectively applying the weight of the first feature value set and the weight of the second feature value set to a first object recognition result obtained by using the first feature value set and a second object recognition result obtained by using the second feature value set; and
    recognizing the object included in the obtained image, based on an object recognition result determined based on the first object recognition result to which the weight of the first feature value set is applied and the second object recognition result to which the weight of the second feature value set is applied.

13. The method of claim 10, wherein determining the standard for using the plurality of feature value sets in the combined way comprises:
    recognizing, by using the first feature value set and the second feature value set, an object included in at least one previous image obtained during a time before the image is obtained;
    comparing an object recognition rate based on the first feature value set with an object recognition rate based on the second feature value set; and
    determining, based on a result of the comparison, the standard for using the first feature value set and the second feature value set.

14. The method of claim 9, wherein the obtained information about the environment, sensed through the at least one sensor, comprises at least one of information about a time when the image is obtained through the camera, information about the weather when the image is obtained through the camera, and information about a place where the image is obtained through the camera.

15. The method of claim 9, wherein recognizing the object included in the obtained image comprises:
    comparing the plurality of feature value sets with a feature value extracted from the obtained image, based on the determined standard for using the plurality of feature value sets in the combined way; and
    recognizing an object having a highest degree of similarity as the object, based on a result of the comparison.

16. The method of claim 9, wherein the feature value sets comprise at least one of information about an outline of the object, information about a brightness of the object, and information about a color of the object.

17. A non-transitory computer-readable recording medium having recorded thereon at least one instruction which, when executed by a processor, causes the processor to:
  obtain, through a camera, an image including an object;
  obtain information, sensed through at least one sensor, about an environment around the camera that obtained the image;
  determine, based on the obtained information about the environment around the camera that obtained the image, a standard for using a plurality of feature value sets in a combined way to recognize the object included in the obtained image; and
  recognize the object included in the obtained image, by using the plurality of feature value sets based on the determined standard for using the plurality of feature value sets in the combined way.

18. The device of claim 1, wherein the information about the environment around the camera that obtained the image is obtained independently of information that is included in the image obtained through the camera.

19. The method of claim 9, wherein the information about the environment around the camera that obtained the image is obtained independently of information that is included in the image obtained through the camera.

20. The non-transitory computer-readable recording medium of claim 17, wherein the information about the environment around the camera that obtained the image is obtained independently of information that is included in the image obtained through the camera.

* * * * *